US010270343B2

(12) United States Patent
Nguyen et al.

(10) Patent No.: US 10,270,343 B2
(45) Date of Patent: Apr. 23, 2019

(54) MULTIPHASE POWER SUPPLY WITH CONSTANT ON-TIME DC-DC CONVERTERS

(71) Applicant: Monolithic Power Systems, Inc., San Jose, CA (US)

(72) Inventors: James Nguyen, San Jose, CA (US); Yan Dong, San Jose, CA (US); Jinghai Zhou, Cupertino, CA (US); Rohan Samsi, Milpitas, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 312 days.

(21) Appl. No.: 14/847,989

(22) Filed: Sep. 8, 2015

(65) Prior Publication Data

US 2016/0315538 A1    Oct. 27, 2016

Related U.S. Application Data

(60) Provisional application No. 62/153,405, filed on Apr. 27, 2015, provisional application No. 62/163,878, filed on May 19, 2015.

(51) Int. Cl.
*H02M 3/158*    (2006.01)

(52) U.S. Cl.
CPC ................................. *H02M 3/1584* (2013.01)

(58) Field of Classification Search
CPC .... H02M 3/156; H02M 3/158; H02M 3/1582; H02M 3/1588; Y02B 70/1466
See application file for complete search history.

(56) References Cited

U.S. PATENT DOCUMENTS

| | | | | |
|---|---|---|---|---|
| 2008/0198636 A1* | 8/2008 | Yang | ...................... | H02M 1/08 363/41 |
| 2011/0025284 A1* | 2/2011 | Xu | ...................... | H02M 3/1584 323/282 |
| 2011/0057632 A1* | 3/2011 | Cheng | ................... | H02M 3/156 323/234 |
| 2011/0133553 A1* | 6/2011 | Bui | ....................... | H02M 3/158 307/31 |
| 2014/0097818 A1* | 4/2014 | Wiktor | ................... | H02M 3/156 323/283 |
| 2015/0236580 A1* | 8/2015 | Jiang | .................... | H02M 3/1584 327/150 |

* cited by examiner

*Primary Examiner* — Nguyen Tran
*Assistant Examiner* — Monica Mata
(74) *Attorney, Agent, or Firm* — Okamoto & Benedicto LLP

(57) ABSTRACT

A multiphase power supply includes several constant ON-time (COT) DC-DC converter integrated circuits (ICs), with each COT DC-DC converter IC providing an output voltage of a phase of the multiphase power supply. The COT DC-DC converter ICs are sequentially turned ON one after another in interleaved fashion. A COT DC-DC converter IC receives a control signal at a take pin and, in response, turns ON its output switch. The COT DC-DC converter IC generates another control signal at a pass pin. The next COT DC-DC converter IC turns ON its output switch in response to receiving the other control signal from the previous COT DC-DC converter IC.

17 Claims, 26 Drawing Sheets

MULTIPHASE POWER SUPPLY WITH CONSTANT ON-TIME DC-DC CONVERTERS

CROSS-REFERENCE TO RELATED APPLICATIONS

This application claims the benefit of U.S. Provisional Application No. 62/163,878, filed on May 19, 2015 and U.S. Provisional Application No. 62/153,405, filed on Apr. 27, 2015, which are incorporated herein by reference in their entirety.

BACKGROUND OF THE INVENTION

1. Field of the Invention

The present invention relates generally to electrical circuits, and more particularly but not exclusively to DC-DC converters and power supplies.

2. Description of the Background Art

A DC-DC converter converts an input voltage to an output voltage, which is higher than the input voltage in the case of a boost converter or lower than the input voltage in the case of a buck converter. Several DC-DC converters may be employed together to form a multiphase power supply, with the DC-DC converters providing output voltages at different phases. A dedicated pulse width modulation (PWM) controller can be used to synchronize the DC-DC converters to generate interleaved output voltages. However, a dedicated controller increases the cost and complexity of the multiphase power supply.

SUMMARY

In one embodiment, a multiphase power supply includes several constant ON-time (COT) DC-DC converter integrated circuits (ICs), with each COT DC-DC converter IC providing an output voltage of a phase of the multiphase power supply. The COT DC-DC converter ICs are sequentially turned ON one after another in interleaved fashion. A COT DC-DC converter IC receives a control signal at a take pin and, in response, turns ON its output switch. The COT DC-DC converter IC generates another control signal at a pass pin. The next COT DC-DC converter IC turns ON its output switch in response to receiving the other control signal from the previous COT DC-DC converter IC.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
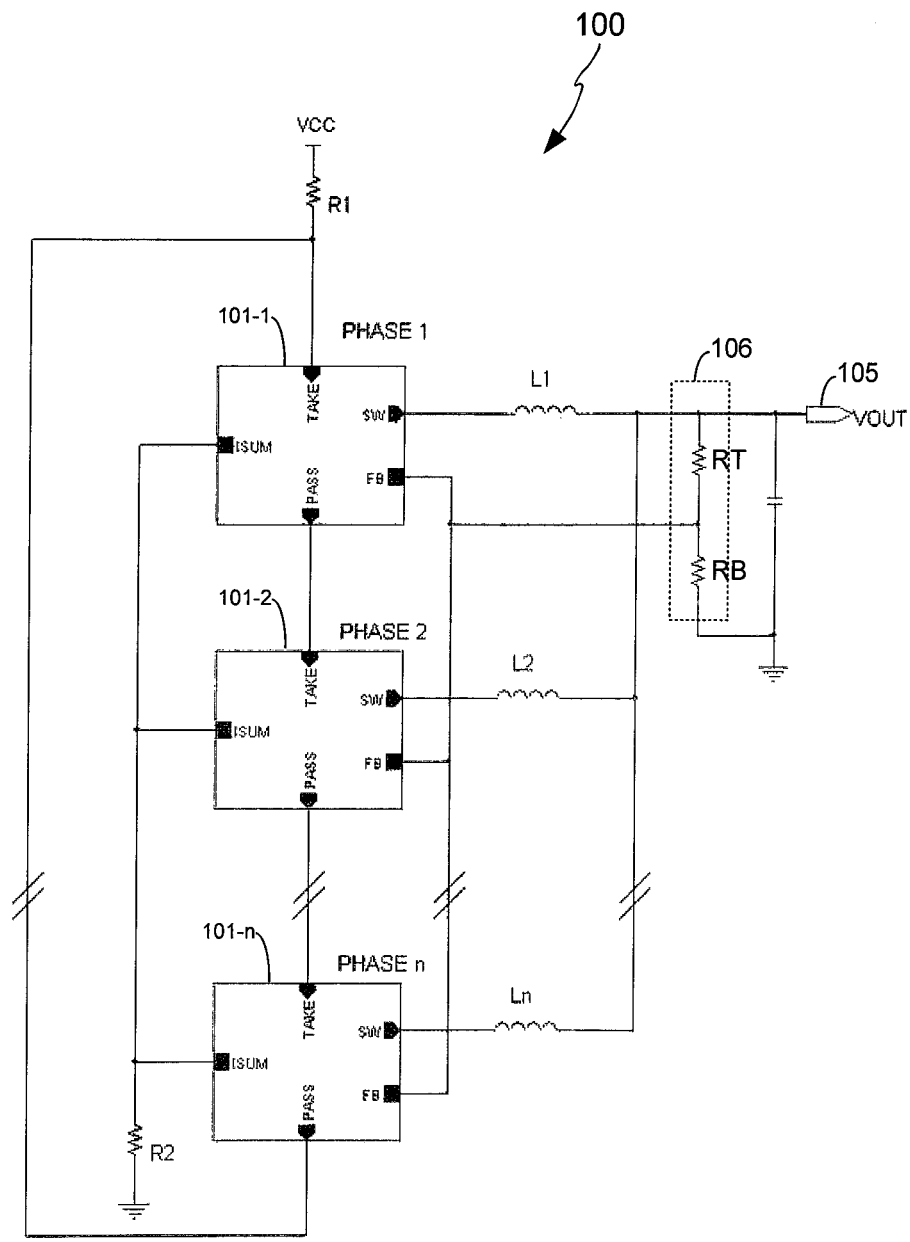
FIG. 1 shows a schematic diagram of a multiphase power supply in accordance with an embodiment of the present invention.

FIG. 1 shows a schematic diagram of a multiphase power supply 100 in accordance with an embodiment of the present invention. In the example of FIG. 1, the power supply 100 comprises a plurality of constant on-time (COT) DC-DC converter integrated circuits (ICs) 101 (i.e., 101-1, 101-2, ..., 101-n). In one embodiment, each COT DC-DC converter IC 101 comprises a constant on-time DC-DC buck converter. It should be noted that a COT DC-DC converter IC 101 can also be a boost converter, for example. In one embodiment, a COT DC-DC converter IC 101 is implemented as a single-chip, monolithic IC with a plurality of pins. A COT DC-DC converter IC 101 is also simply referred to herein as a "converter 101" for ease of discussion.

In the example of FIG. 1, the converters 101 are configured to operate on their own without a centralized controller. This advantageously allows the power supply 100 to have an arbitrary number of interleaved output phases without being constrained by the limitations of the centralized controller. The power supply 100 is thus readily scalable to accept more converters 101 for higher load current.

In the example of FIG. 1, the converter 101-1 generates an output voltage at a first phase, the converter 101-2 generates an output voltage at a second phase, and so on. The power supply 100 may have a number of interleaved output phases equal to the number of converters 101 in the power supply 100. The output voltage VOUT of the power supply 100, which is at the node 105, is thus generated from the interleaved output voltages of the converters 101. In one embodiment, a converter 101 has its own internal constant ON-time control loop, thereby also allowing the converter 101 to operate in standalone, i.e., without other converters 101, in some embodiments.

A converter 101 may include an SW pin coupled to an output node of its power stage and an FB pin for receiving a feedback signal, which in this example is a feedback voltage, indicative of the output voltage VOUT of the power supply 100. In the example of FIG. 1, the output node of the power stage of a converter 101 is coupled to the node 105 of the power supply 100 by way of a corresponding output inductor. More specifically, an output inductor L1 couples the SW pin of the converter 101-1 to the node 105, an output inductor L2 couples the SW pin of the converter 101-2 to the node 105, and so on. The output inductors may be tied together at the node 105 to generate the output voltage VOUT of the power supply 100. A feedback network 106 may be employed to generate the feedback voltage that is indicative of the output voltage VOUT. In the example of FIG. 1, the feedback network 106 comprises a voltage divider formed by the resistors RT and RB. The FB pins of the converters 101 may be coupled to the feedback network 106 to receive a common feedback voltage.

In one embodiment, a converter 101 includes a TAKE pin for receiving a GO indicator and a PASS pin for transmitting a GO indicator. A GO indicator may be a positive pulse, for example. In one embodiment, a converter 101 turns ON only in response to receiving a GO indicator at its TAKE pin. For example, a converter 101 may wait for a rising edge of a positive pulse at its TAKE pin before turning ON. When a converter 101 turns ON, it turns ON its internal output switch (e.g., transistor MN3 in FIG. 2) to connect an input voltage (e.g., VIN in FIG. 2) to a corresponding output inductor (e.g., inductor L8 in FIG. 2). The output switch may be used in conjunction with a free-wheeling diode or a synchronous switch (e.g., transistor MN4 in FIG. 2). The output switch is also referred to as a "high side switch" because it connects the input voltage to the output inductor. Being a COT DC-DC converter, the converter 101 turns ON its output switch for a predetermined, constant length of time. At the same time, the converter 101 outputs a GO indicator at its PASS pin. A GO indicator may be a pulse with a pulse time that is set by a one-shot circuit (e.g., one-shot circuit 252 in FIG. 2). The next converter 101 in the sequence may turn ON on a negative edge of the pulse. Therefore, the width of the output of the one-shot circuit may be the delay time for the next converter 101 that will turn ON. The converters 101 may thus be sequentially connected to turn ON one after another by coupling the PASS pin of a converter 101 to the TAKE pin of the next converter 101 in the sequence.

At initialization during startup, a converter 101 may detect for presence of a resistance value (e.g. see, resistor R1) at its TAKE pin to determine whether or not to turn ON (i.e., turn ON its output switch). In the example of FIG. 1, only the converter 101-1 has a resistor R1 connected to its TAKE pin. Accordingly, only the converter 101-1 turns ON during initialization; the other converters 101 wait to receive a GO indicator at their corresponding TAKE pin before turning ON.

A converter 101 may include an ISUM pin for outputting a monitor current that is indicative of the current flowing through its output inductor. In the example of FIG. 1, the ISUM pins of the converters 101 are tied together to a terminal of a resistor R2; the other terminal of the resistor R2 is tied to ground. The voltage developed across the resistor R2 is thus indicative of the sum of the output inductor currents of all the converters 101 in the power supply 100. A converter 101 may use the ripple of the sum of the output inductor currents in conjunction with a received GO indicator for synchronization.

Figure 2:
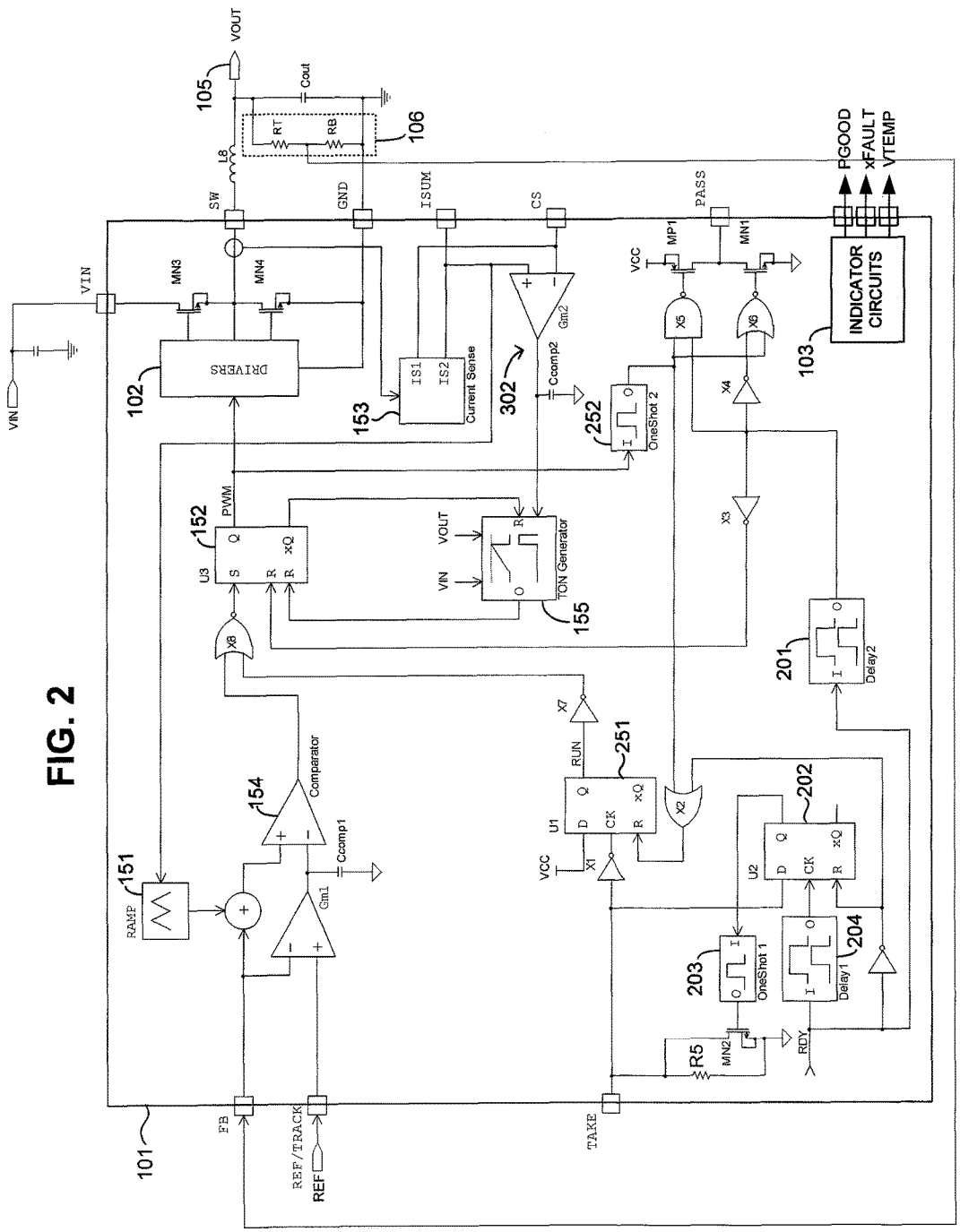
FIG. 2 shows a schematic diagram of a constant ON-time (COT) DC-DC converter integrated circuit (IC) in accordance with an embodiment of the present invention.

FIG. 2 shows a schematic diagram of a converter 101 in accordance with an embodiment of the present invention. FIG. 2 shows the previously described FB, TAKE, SW, ISUM, and PASS pins. In the example of FIG. 2, the converter 101 further includes a VIN pin for receiving an input voltage VIN, a GND pin for receiving a signal ground reference, a REF/TRACKING pin for receiving an error reference signal (which in this example is an error reference voltage) and a CS pin for receiving a current sense signal. As can be appreciated, a pin of the converter 101 may or may not be used depending on the application. A converter 101 may also have fewer or more pins.

In the example of FIG. 2, a driver circuit 102 receives a PWM signal that controls switching of the output switch MN3 (e.g., a power field effect transistor (FET)) at the power stage of the converter 101. The driver circuit 102 turns ON the output switch MN3 during the ON time of the PWM signal and turns OFF the output switch MN3 during the OFF time of the PWM signal. The PWM signal has a fixed ON-time because the converter 101 is a COT DC-DC converter. The power stage further includes a switch MN4 (e.g., a power FET), which synchronously switches with the output switch MN3. That is, the switch MN4 is OFF when the output switch MN3 is ON, and the switch MN4 is ON when the output switch MN3 is OFF. In the example of FIG. 2, the output node of the power stage is connected to the SW pin. Accordingly, when the converter 101 turns ON, the output switch MN3 is switched ON to connect the input voltage VIN at the VIN pin to the output inductor L8 at the SW pin. The other end of the output inductor L8 is connected to the node 105 of the power supply.

In the example of FIG. 2, a current sense circuit 153 senses the output inductor current that flows out of the SW pin, through the output inductor L8, and to the node 105. The current sense circuit 153 outputs a corresponding monitor current (IS2) at the ISUM pin and a current sense signal (IS1) at the CS pin. The monitor current at the ISUM pin and the current sense signal at the CS pin may be the same current signal, albeit provided separately. With multiple converters 101, each converter 101 may have its CS pin separately connected to a CS resistor. On the other hand, the ISUM pins of all the converters 101 may be connected together to a common ISUM resistor, where the ISUM resistor value equals the value of the CS resistor divided by the number of converters 101. This allows for $$VCS=IS1*R \text{ and } VISUM=(IS2*n)*(R/n) \Rightarrow VCS=VISUM$$

where VCS is the voltage on the CS pin, IS1 is the current on the CS pin, R is the CS resistor, VISUM is the voltage on the ISUM pin, n is the number of converters 101, and IS2 is the current on the ISUM pin.

A converter 101 may be employed in standalone or as one of a plurality of converters 101 of a multiphase power supply. A plurality of converters 101 in a multiphase power supply may be controlled by a dedicated controller. A plurality of converters 101 in a multiphase power supply may also be controlled by or work in conjunction with a generic microprocessor, instead of a dedicated controller. In a microprocessor-based power supply, a converter 101 may include condition circuits 103 for generating condition signals, such as a power good signal (PGOOD) for reporting that the output voltage VOUT is within regulated value, a fault signal (xFAULT) for reporting a fault (e.g., output switch short circuit), a temperature signal (VTEMP) for reporting the junction temperature (i.e., die temperature of the monolithic IC) of the converter 101 or for reporting an over temperature, and other condition signals. The condition signals may be generated by conventional circuits internal to the converter 101 and may be received by the microprocessor to control the operation of the converters 101. The other components of the converter 101 are further described below beginning with FIG. 3.

Figure 3:
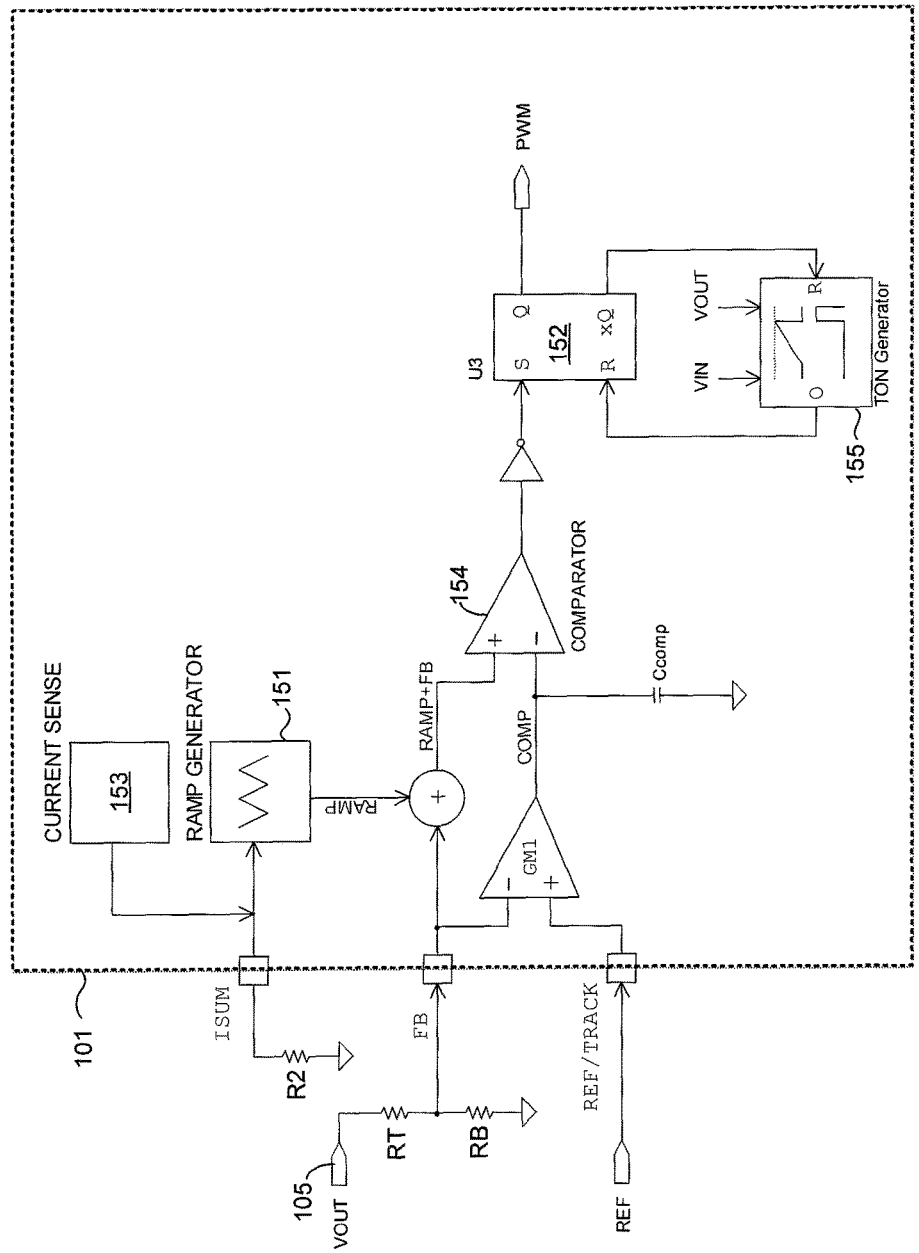
FIG. 3 shows a schematic diagram of a section of the converter of FIG. 2 relating to ramp compensation in accordance with an embodiment of the present invention.

FIG. 3 shows a schematic diagram of a section of the converter 101 relating to ramp compensation in accordance with an embodiment of the present invention. Generally speaking, ramp compensation involves compensating the ramp voltage that is used to determine when to turn ON the output switch for a constant length of time. As shown in FIG. 3, the converter 101 includes the current sense circuit 153, a ramp generator 151, a comparator 154, a latch 152, an amplifier GM1, and an ON-time (TON) generator 155. These components are also shown in FIG. 2.

As shown in FIG. 3, the feedback voltage (FB) indicative of the output voltage VOUT of the power supply 100 at the node 105 is received on the FB pin from the feedback network comprising the resistors RT and RB. An error reference voltage (REF) that is received on the REF/TRACK pin controls the level of the output voltage VOUT of the power supply 100. An external circuit, such as a microprocessor or a discrete circuit, may be coupled to the REF/TRACK pin to set the error reference voltage and thus the level of the output voltage VOUT of the power supply 100. The error reference voltage may also be from an internal reference generator. When the REF/TRACK pins of all the converters 101 in the power supply 100 are connected together, the voltage on a REF/TRACK pin is dominated by the converter 101 that has the highest voltage on its REF/TRACK pin.

An amplifier GM1 compares the feedback voltage to the error reference voltage to determine the level of the output voltage relative to the error reference voltage and accordingly outputs a compensation signal, which in this example is a compensation voltage (COMP). It is to be noted that the comparator output stages are the same for all phases of the power supply 100 because all of the converters 101 have the same signals at the ISUM, FB, and REF/TRACK pins.

The current sense circuit 153 provides a monitor current that is indicative of the output inductor current. The monitor current flows to the resistor R2 (also shown in FIG. 1) to develop a voltage thereon. The ramp generator 151 removes the DC voltage of the monitor current at the ISUM pin and then outputs an AC (alternating current) ramp voltage (RAMP). A comparator 154 compares the sum of the ramp voltage and the feedback voltage (RAMP+FB) to the compensation voltage (COMP) at the output of the amplifier GM1. When the sum of the feedback and ramp voltages (FB+RAMP) is less than the compensation voltage (COMP), the latch 152 is set (PWM=1) and the timer of the ON-time generator 155 is started. The latch 152 is reset (PWM=0) when the timer of the ON-time generator 155 expires (PWM=0). The PWM signal output of the latch 152 controls the switching of the output switch, which is the switch MN3 in FIG. 2. In one embodiment, the output switch turns ON when the PWM signal is HIGH (PWM=1) and turns OFF when the PWM signal is LOW (PWM=0). Because the timer of the ON-time generator 155 has a constant timing value, the output switch is turned ON for a fixed duration when the converter 101 is turned ON.

Figure 4:
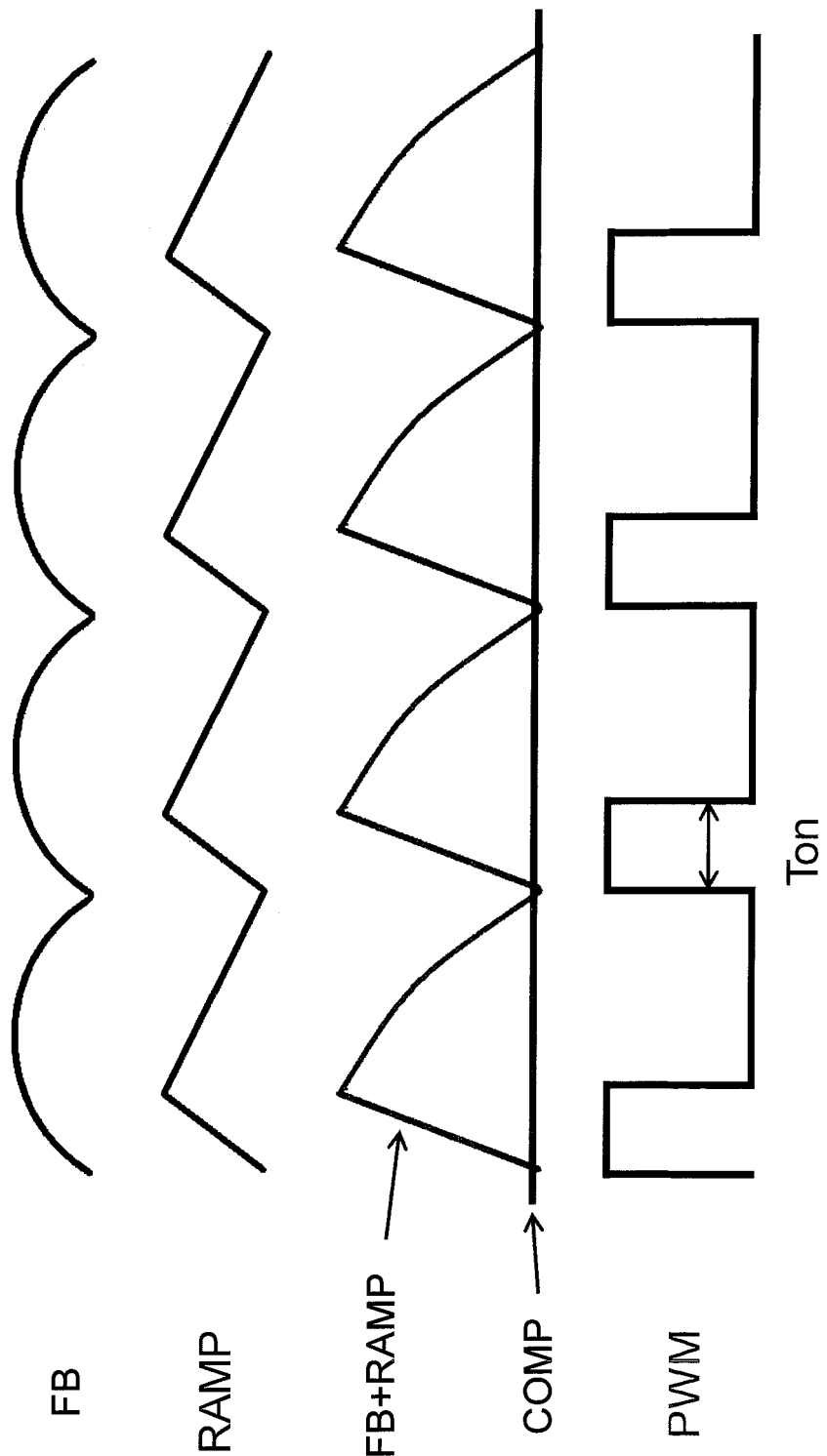
FIG. 4 shows a timing diagram of the circuit of FIG. 3 in accordance with an embodiment of the present invention.

FIG. 4 shows a timing diagram of the circuit of FIG. 3 in accordance with an embodiment of the present invention. Shown in FIG. 4 are the feedback voltage (FB), the ramp voltage (RAMP), the sum of the feedback voltage and the ramp voltage (FB+RAMP), the compensation voltage (COMP), and the PWM signal (PWM). As shown in FIG. 4, the PWM signal goes HIGH (PWM=1) with a constant ON-time when the sum of the feedback and ramp voltages becomes lower than the compensation voltage. The PWM signal goes LOW (PWM=0) at the end of the ON-time.

Figure 5:
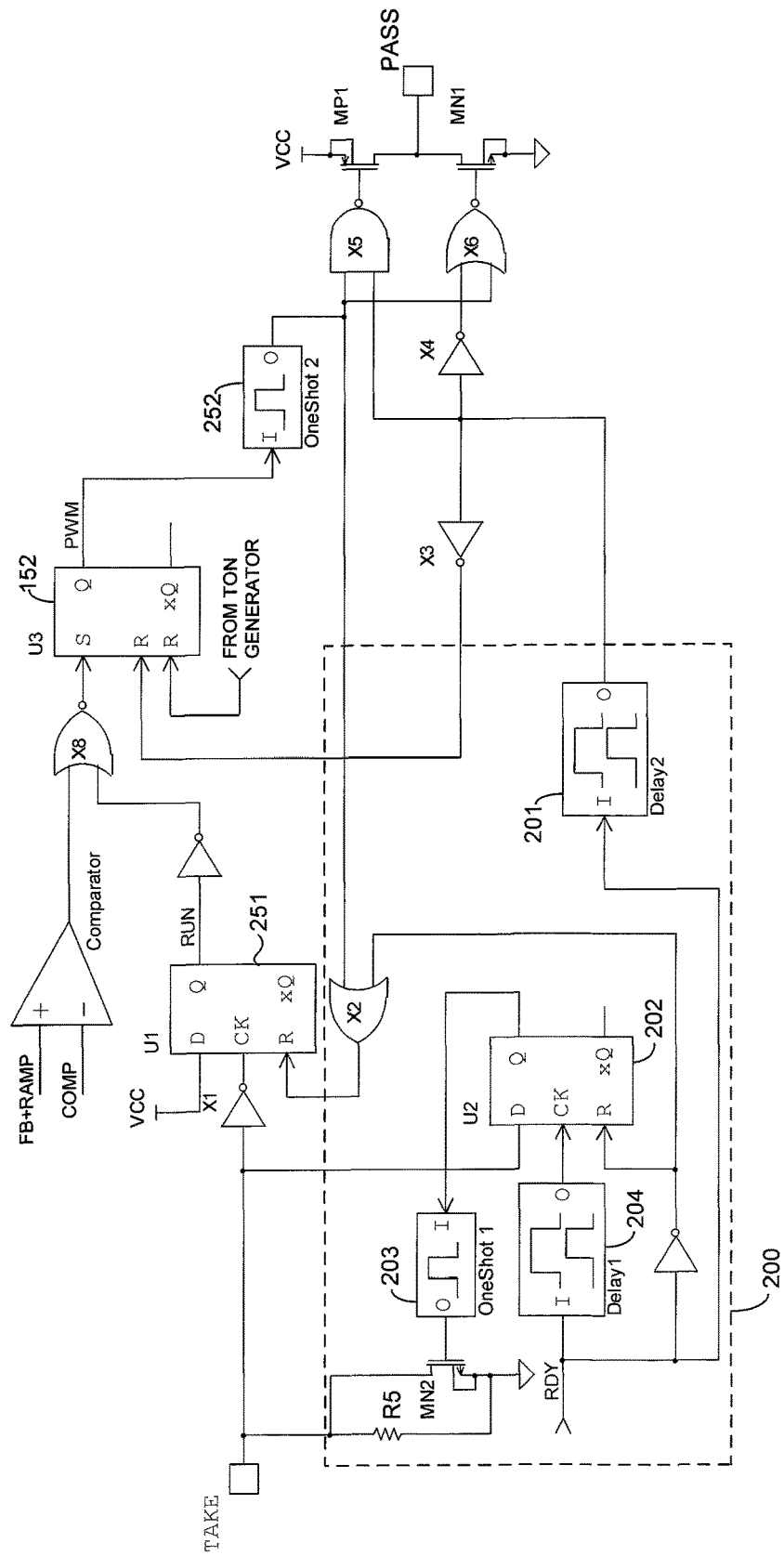
FIG. 5 shows a schematic diagram of a section of the converter of FIG. 2 relating to interleaving initialization in accordance with an embodiment of the present invention.

FIG. 5 shows a schematic diagram of a section 200 of the converter 101 relating to interleaving initialization in accordance with an embodiment of the present invention. As shown in FIG. 5, the converter 101 may include a one-shot circuit 203, a delay line 204, a latch 202, and a delay line 201. These components are also shown in FIG. 2.

In one embodiment, the circuitry of the section 200 identifies which phase among a plurality of phases will first turn ON. In other words, when the power supply 100 is powered up, the circuitry of the section 200 identifies the first converter 101 that will turn ON (i.e., turn ON its output switch). The other converters 101 will wait for a GO indicator from another converter 101 before turning ON. In the example of FIG. 5, the converter 101 that is going to turn ON first (Phase1) has a resistor between the TAKE pin and the VCC supply rail (e.g., see converter 101-1 of FIG. 1). Being the first phase of a multiphase power supply, the converter 101 with a resistor between the TAKE pin and the VCC supply rail is also referred to herein as the "Phase1 converter 101."

In the example of FIG. 5, the converter 101 includes an internal node for accepting a ready signal (RDY). The ready signal may be from an internal power on reset (POR) circuit (not shown) of the converter 101. The ready signal may be asserted (RDY=1) when the converter 101 is enabled and all of its voltage and current biasing are proper. When the ready signal is LOW (RDY=0), the D flip-flop 202 is reset and the switches MP1, MN1, and MN2 are OFF. The Phase1 converter 101 has a resistor between the TAKE pin and the VCC supply rail. Therefore, the TAKE pin of the Phase1 converter 101 is HIGH, while the TAKE pin of the other converters 101 (i.e., the ones without a resistor between the TAKE pin and the VCC supply rail) are pulled LOW by the resistor R5.

When the ready signal is HIGH (RDY=1), the D flip-flop 202 is reset and goes LOW, and a logic HIGH is clocked from the D input to the Q output of the D flip-flop 202 after a delay (Delay1) through the delay line 204. Among the converters 101 in the multiphase power supply 100, only the Phase1 converter 101 clocks in a logic HIGH into its D flip-flop 202, which turns ON the switch MN2 for a short period of time that is set by the one-shot circuit 203. This results in the TAKE pin being pulled LOW then HIGH, thereby clocking the D flip-flop 251. The RUN signal at the Q output of the D flip-flop 251 therefore goes from LOW to HIGH to allow the Phase1 converter 101 to turn ON first. The TAKE pins of the other converters 101 remain LOW during this time. The gates X5 and X6 begin to accept a signal from the one-shot circuit 252 after a delay time (Delay2) dictated by the delay line 201. In one embodiment, the delay time through the delay line 201 (Delay2) is longer than the delay through the delay line 204 (Delay1) plus the pulse time of the one-shot circuit 203 (Delay1+Onshot1 time).

In other embodiments, the resistor for identifying the Phase1 converter 101 may also be placed from the TAKE pin to ground. In that case, the resistor R5 is connected to the VCC supply rail instead of the TAKE pin, and the D input of the D flip-flop 202 is connected to the output of the inverter X1 instead of the TAKE pin.

Figure 6:
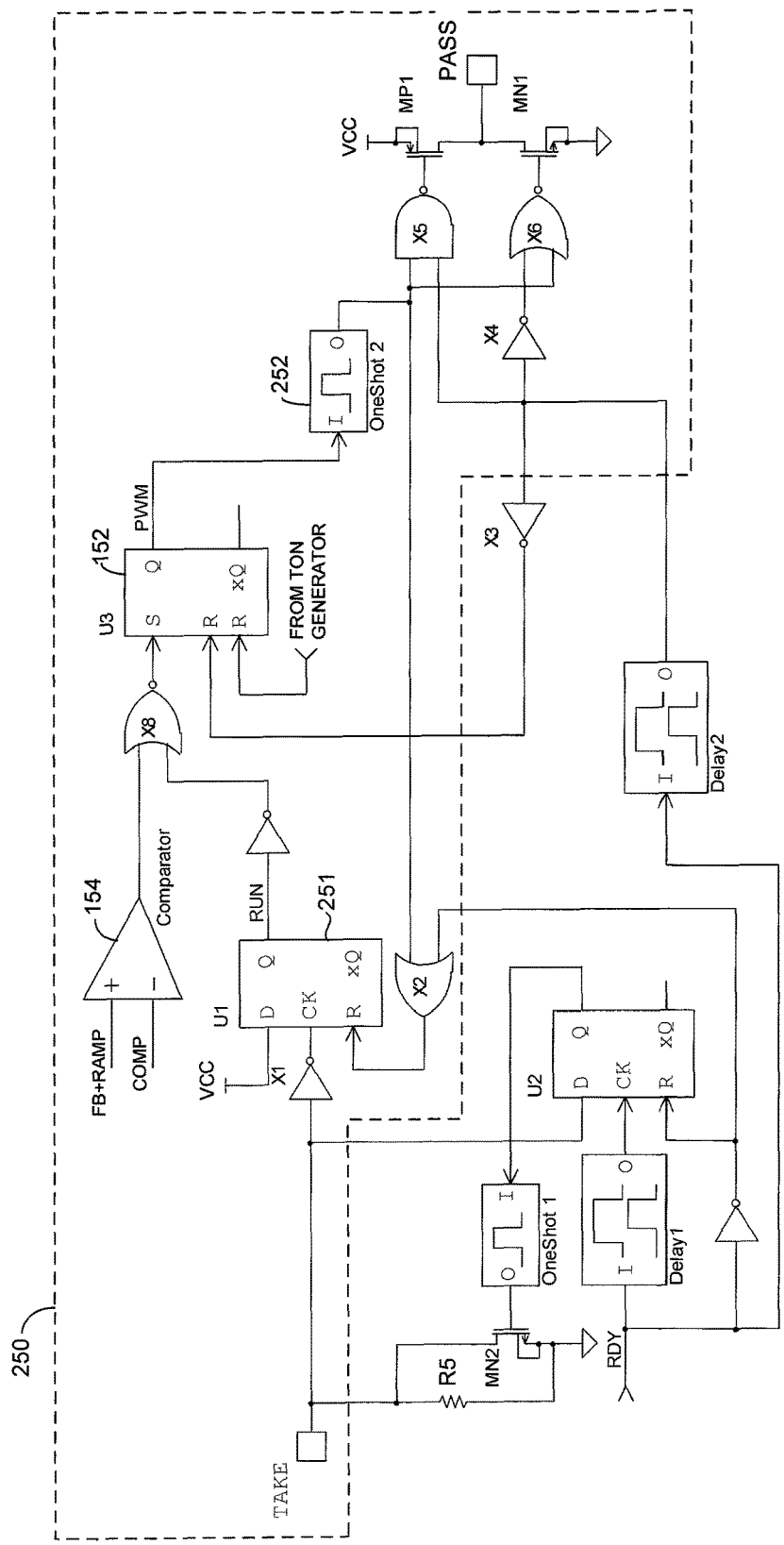
FIG. 6 shows a schematic diagram of a section of the converter of FIG. 2 relating to multiphase interleaving in accordance with an embodiment of the present invention.

FIG. 6 shows a schematic diagram of a section 250 of the converter 101 relating to multiphase interleaving in accordance with an embodiment of the present invention. As shown in FIG. 6, the converter 101 may include the D flip-flop 251, the comparator 154, the latch 152, the one-shot circuit 252, the gate X5, the gate X6, the switch MP1, and the switch MN1. These components are also shown in FIG. 2.

The circuitry of the section 250 provides the interleaving logic of the converter 101. The converters 101 of the multiphase power supply 100 sequentially turn ON one by one. A converter 101 turns ON once it receives a GO indicator at its TAKE pin. In one embodiment where the GO indicator is a positive pulse, the converter 101 may turn ON in response to detecting the rising edge of the positive pulse. The converter 101 passes a positive pulse to the PASS pin. The PASS pin is connected to the TAKE pin of next converter 101, and so on.

When the RUN signal is HIGH (RUN=1), it allows the latch 152 to be set, which causes the PWM signal to become HIGH (PWM=1) to turn ON the output switch. The one-shot circuit 252 generates a positive pulse when the PWM signal becomes HIGH (PWM=1). This positive pulse resets the D flip-flop 251, thereby making the RUN signal LOW (RUN=0). The positive pulse generated by the one-shot circuit 252 also propagates to the gate X5, gate X6, switch MP1, and switch MN1 to drive the PASS pin, which is connected to the TAKE pin of the next converter 101 (i.e., the next phase). The TAKE pin of next converter 101 then clocks its D flip-flop 251 so that its corresponding RUN signal is HIGH on the negative edge of the positive pulse. The RUN signal being HIGH (RUN=1) allows the latch 152 to be set (PWM=1) to turn ON its output switch, and the cycle repeats to the next converter 101 for the next phase.

Figure 7:
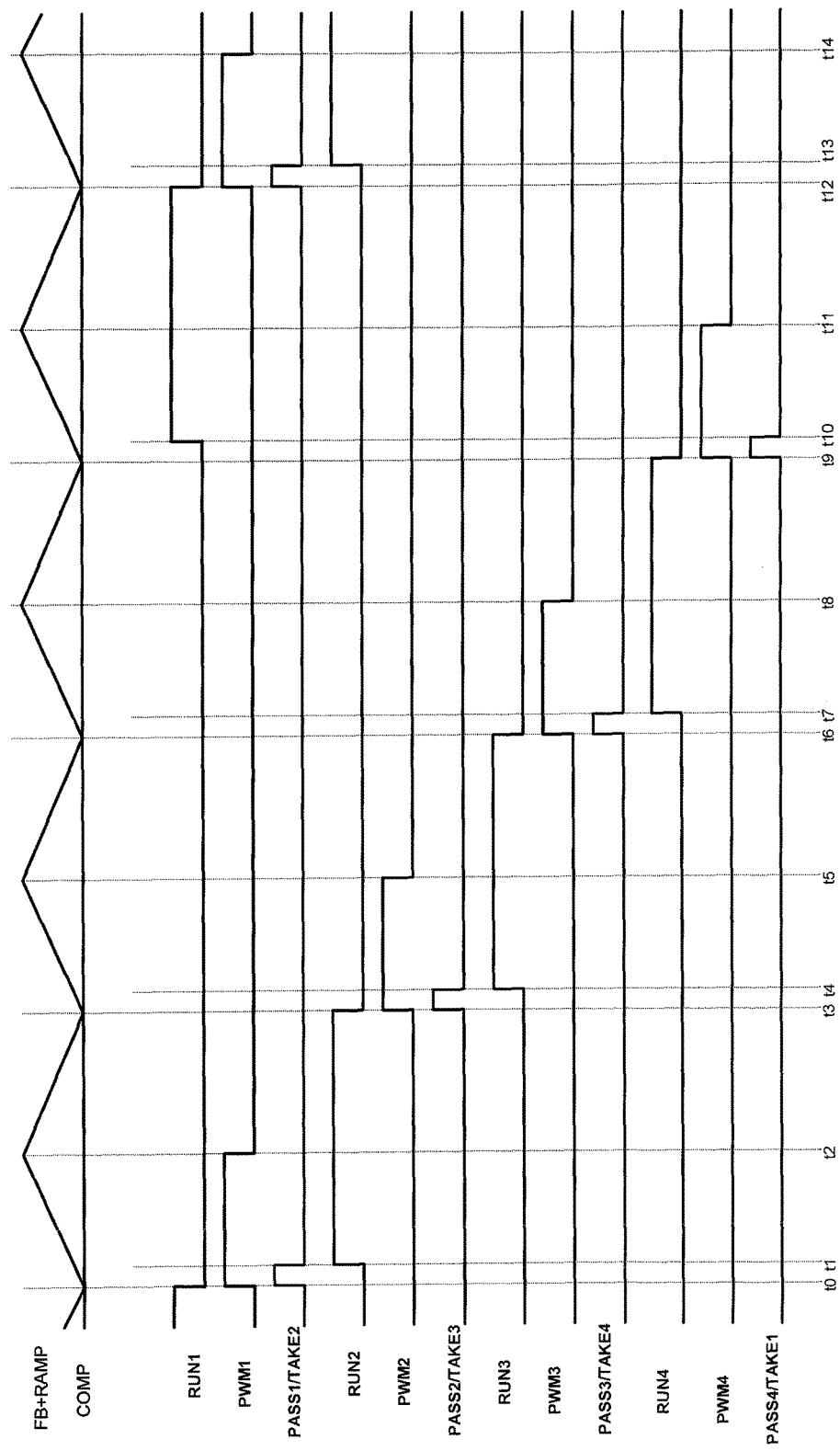
FIG. 7 shows a timing diagram of the multiphase power supply of FIG. 1 in accordance with an embodiment of the present invention.

FIG. 7 shows a timing diagram of the power supply 100 of FIG. 1 in accordance with an embodiment of the present invention. FIG. 7 illustrates the operation of the power supply 100 with four phases, i.e. four converters 101. In the example of FIG. 7, the FB+RAMP and COMP signals are common to all of the converters 101. The other signal names are appended with the number of the phase. That is, RUN1 is the RUN signal of the first phase (i.e., the converter 101 that turns ON in the first phase), PWM1 is the PWM signal of the first phase, PASS1 is the signal at the PASS pin of the first phase, and TAKE1 is the signal at the TAKE pin of the first phase. Similarly, RUN2 is the RUN signal of the second phase (i.e., the converter 101 that turns ON in the second phase), PWM2 is the PWM signal of the second phase, PASS2 is the signal at the PASS pin of the second phase, and TAKE2 is the signal at the TAKE pin of the second phase, and so on. PASS1/TAKE2 refers to the signal that is on the PASS pin of the first phase and on the TAKE pin of the second phase.

Figure 8:
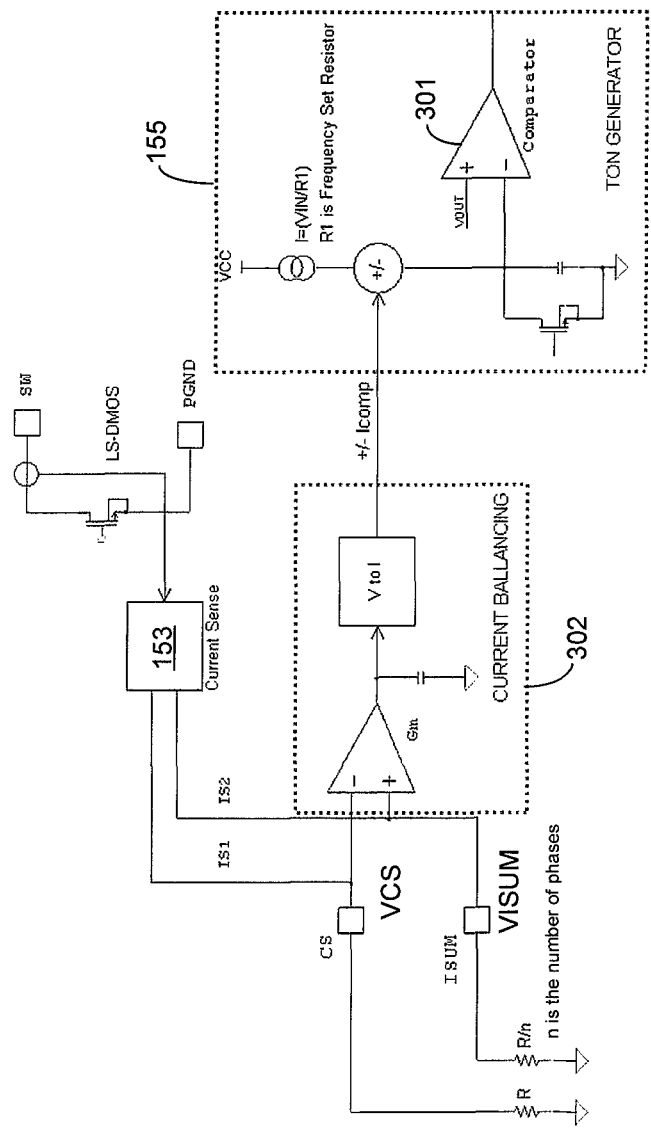
FIG. 8 shows a schematic diagram of a section of the converter of FIG. 2 relating to current balancing in accordance with an embodiment of the present invention.

FIG. 8 shows a section of the converter 101 relating to current balancing in accordance with an embodiment of the present invention. FIG. 8 shows further details of a current balancing circuit 302 and the ON-time generator 155, which are also shown in FIG. 2. In the example of FIG. 8, the resistor that is connected to the ISUM pin may have a value of R/n, where R is the value of the resistor on the CS pin and n is the number of phases in the power supply (e.g., n=4 when there are four converters 101).

In the example of FIG. 8, the current balancing circuit 302 modulates the ON-time until the voltage at the CS pin becomes equal to the voltage at the ISUM pin. The voltage VCS on the CS pin represents the output inductor current of the converter 101. The voltage VISUM on the ISUM pin represents the total output inductor currents of all the converters 101 in the power supply 100. The current balancing circuit 302 may comprise a Gm-C amplifier and a voltage-to-current (V to I) converter. For any error between the voltage VCS and the voltage VISUM, the current balancing circuit 302 will output a current Icomp that can add or subtract from the current used to generate the ON-time ramp of the ON-time generator 155. For example, when the voltage VCS is greater than the voltage VISUM, the current balancing circuit 302 reduces the charging current of the ON-time generator 155 thereby shortening the ON-time. This in turn lowers the output inductor current, thus making the voltage VCS lower. The current balancing circuit 302 keeps making corrections until the voltage VCS is equal to the voltage VISUM.

Figure 9:
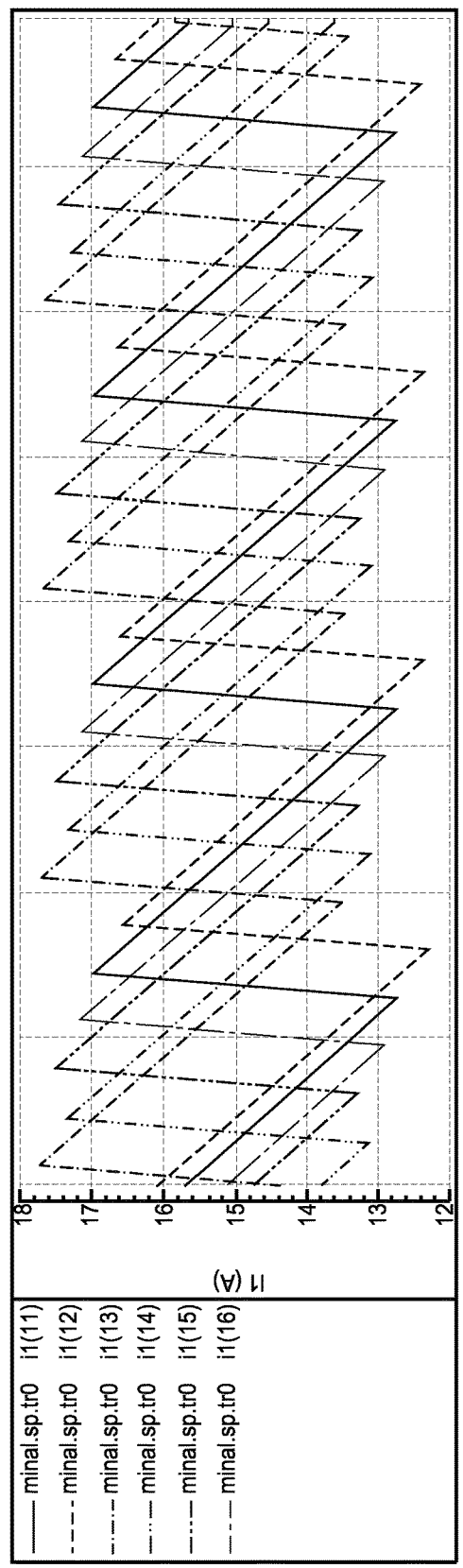
FIGS. 9 and 10 show waveforms of output inductor currents of a multiphase power supply without current balancing (FIG. 9) and with current balancing (FIG. 10).
Figure 10:
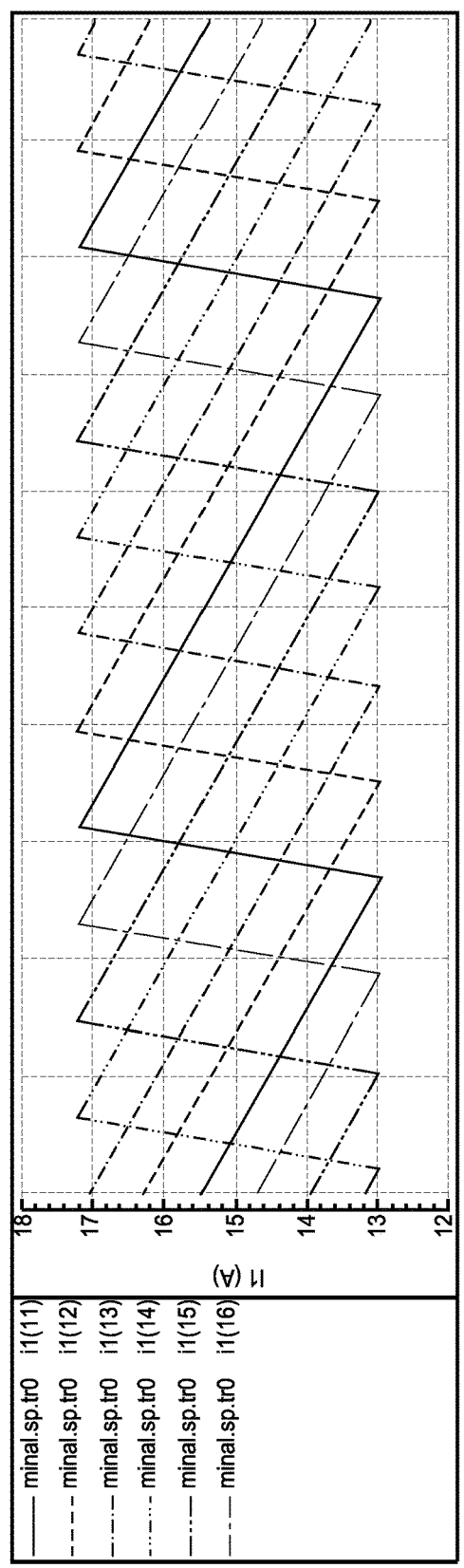

FIG. 9 shows waveforms of output inductor currents of six converters 101 in a multiphase power supply without a current balancing circuit. As shown in FIG. 9, without current balancing, the converters 101 have output inductor currents that are slightly different from each other. The differences in output inductor currents may be due to mismatch of ON-time or output inductor value. FIG. 10 shows waveforms of output inductor currents of six converters 101 in a multiphase power supply with a current balancing circuit. As shown in FIG. 10, current balancing advantageously allows all of the output inductor currents to be at the same level.

Figure 11:
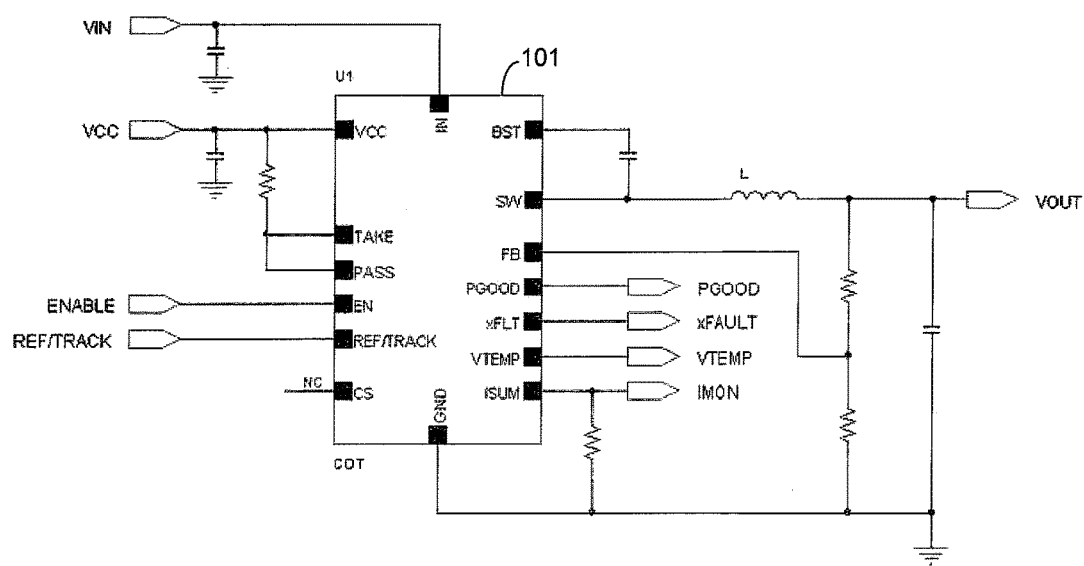
FIG. 11 shows a COT DC-DC converter IC in standalone mode in accordance with an embodiment of the present invention.

FIG. 11 shows a converter 101 in standalone in accordance with an embodiment of the present invention. In the example of FIG. 11, the converter 101 converts an input voltage VIN to an output voltage VOUT. In the example of FIG. 11, the converter 101 includes an EN pin for receiving an enable signal to enable or disable the converter 101. An error reference voltage may be coupled to the REF/TRACK pin to set the regulation voltage of the converter 101. The converter 101 may also output power good (PGOOD), fault (xFAULT), and temperature (VTEMP) condition signals. The monitor current output at the ISUM pin may be used as a current monitor signal (IMON) to report the output inductor current (current through the inductor L in FIG. 11) to an external circuit.

Figure 12:
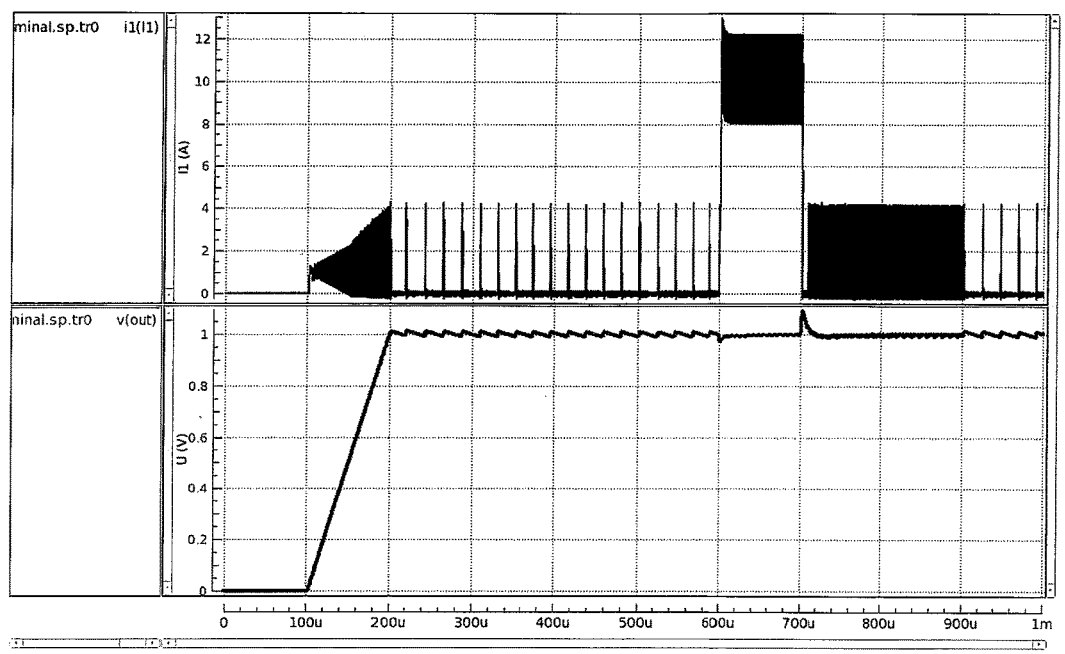
FIGS. 12-14 show waveforms of the standalone COT DC-DC converter IC of FIG. 11 in accordance with an embodiment of the present invention.
Figure 13:
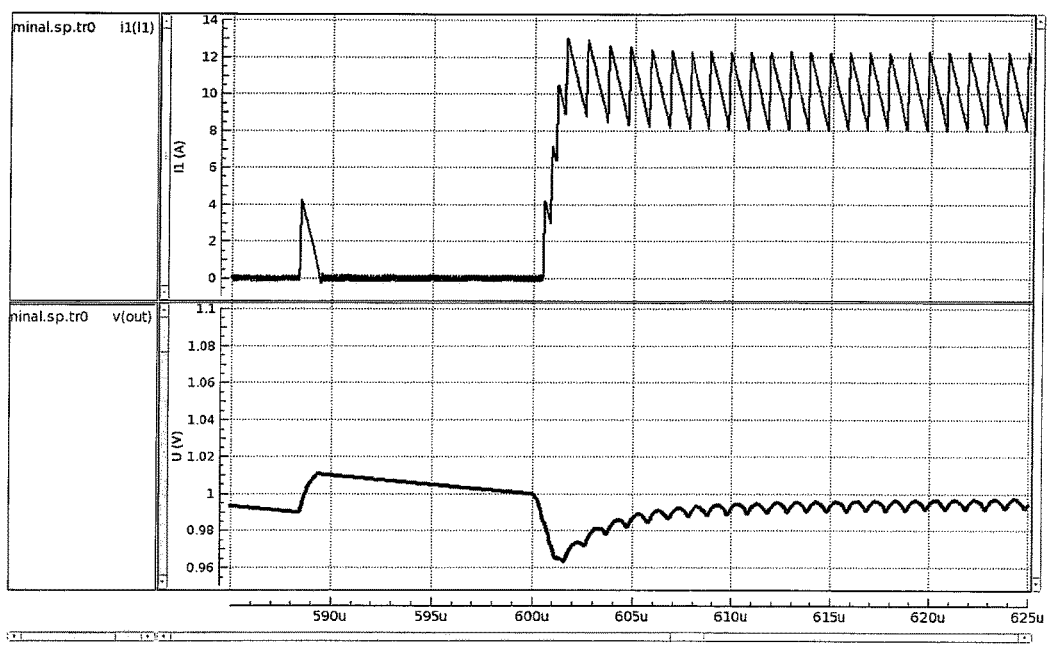
Figure 14:
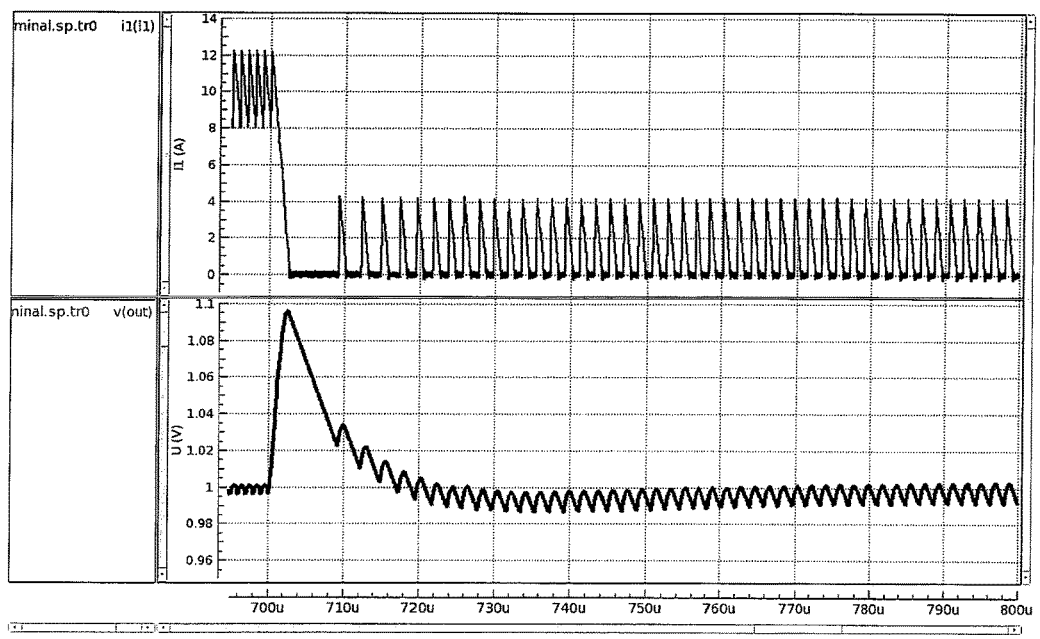

FIGS. 12-14 show waveforms of the standalone converter 101 of FIG. 11 in accordance with an embodiment of the present invention. FIG. 12 shows waveforms of output inductor current (top) and output voltage VOUT (bottom) at start-up. In the example of FIG. 12, a 10A load was applied at 600 us and the 10A load was removed at 700 us. FIG. 13 shows the output inductor current and the output voltage VOUT when the 10A load was applied (zoom in at 600 us of FIG. 12). FIG. 14 shows the output inductor current and the output voltage VOUT when the 10A load was removed (zoom in at 700 us of FIG. 12).

Figure 15:
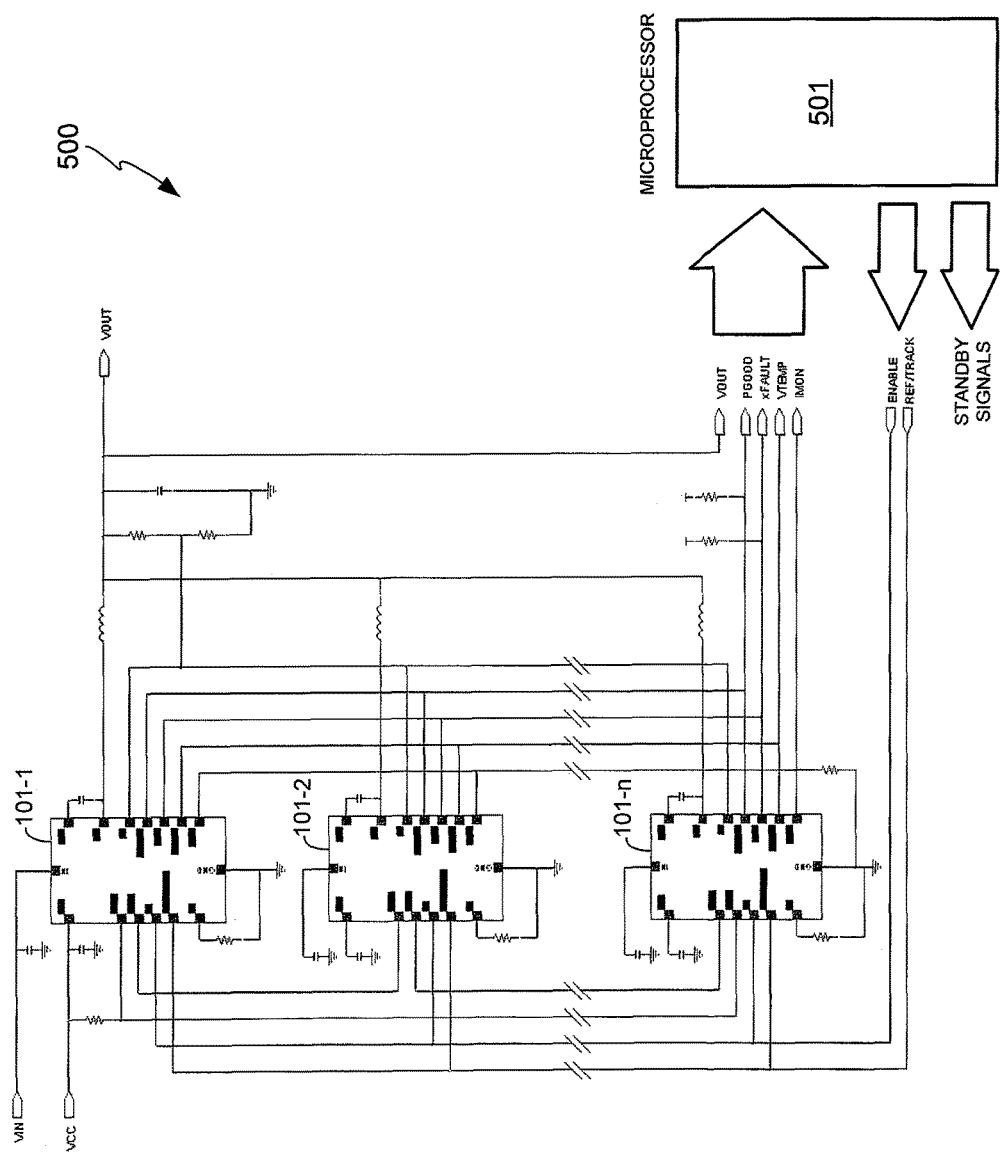
FIG. 15 shows a schematic diagram of a multiphase power supply with a microprocessor in accordance with an embodiment of the present invention.

FIG. 15 shows a schematic diagram of a multiphase power supply 500 in accordance with an embodiment of the present invention. The multiphase power supply 500 includes a plurality of converters 101, with each converter 101 providing a phase of the power supply. The converters 101 are arranged such that they sequentially turn ON as in FIG. 1 by connecting the PASS pin of one converter 101 to the TAKE pin of the next converter 101.

In the example of FIG. 15, the converters 101 operate in conjunction with a generic microprocessor 501. The microprocessor 501 can be any suitable commercially-available microprocessor or other single-chip processor with integrated analog and digital input/output pins, configurable firmware, and/or data acquisition and processing features. The microprocessor 501 is "generic" in that it is not specially designed to work with the converters 101 and includes common microprocessor components, such as a processor and memory.

In the example of FIG. 15, the microprocessor 501 may enable or disable the converters 101 by sending an ENABLE signal to the EN pins of the converters 101. The microprocessor 501 may also send an error reference voltage to the REF/TRACKING pins of the converters 101. The microprocessor 501 may receive condition signals, such as power good (PGOOD), fault (xFAULT), temperature (VTEMP), and current monitor (IMON) signals, from the converters 101. The microprocessor 501 may control the converters 101 based on the condition signals. For example, the microprocessor 501 may disable the converters 101 when at least one of the converters 101 reports a fault.

In some embodiments, a converter 101 may include a STANDBY pin (e.g., see FIG. 19) for placing the converter 101 on standby, such as for phase shedding. In those embodiments, the microprocessor 501 may output a separate standby signal to individual converters 101 to selectively place a converter 101 on standby, such as during light load conditions.

Figure 16:
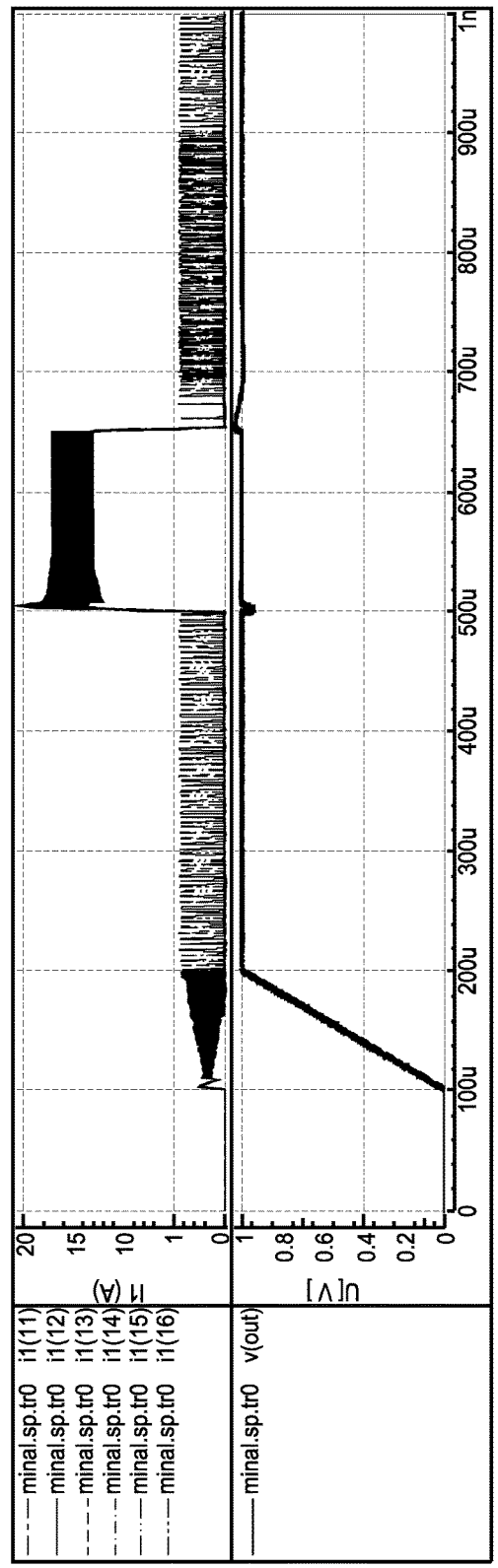
FIGS. 16-18 show waveforms of the multiphase power supply of FIG. 15 in accordance with an embodiment of the present invention.
Figure 17:
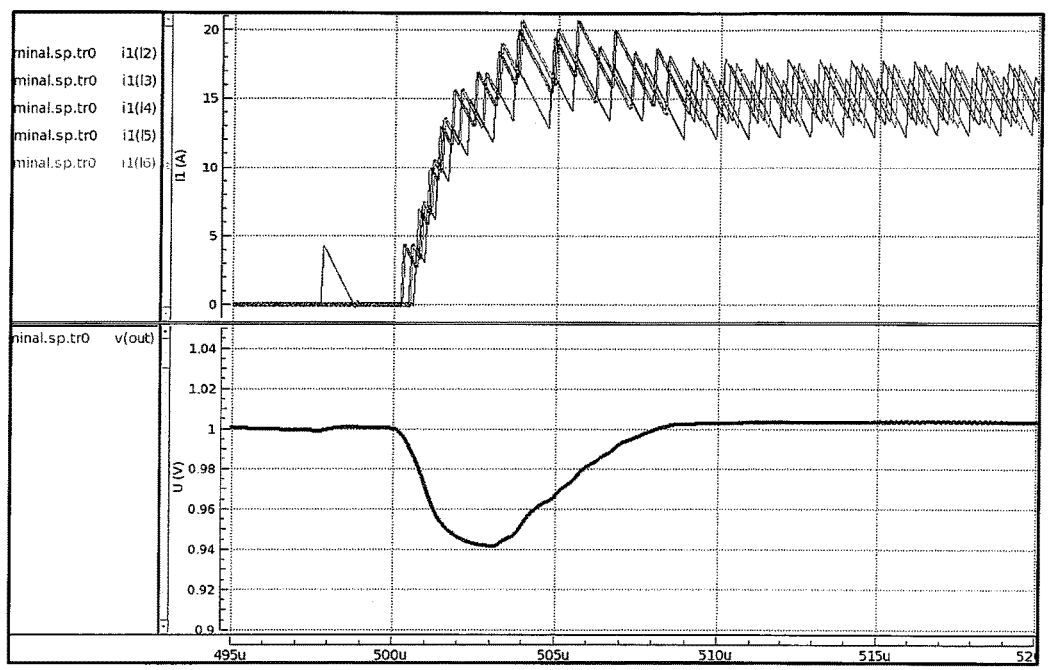
Figure 18:
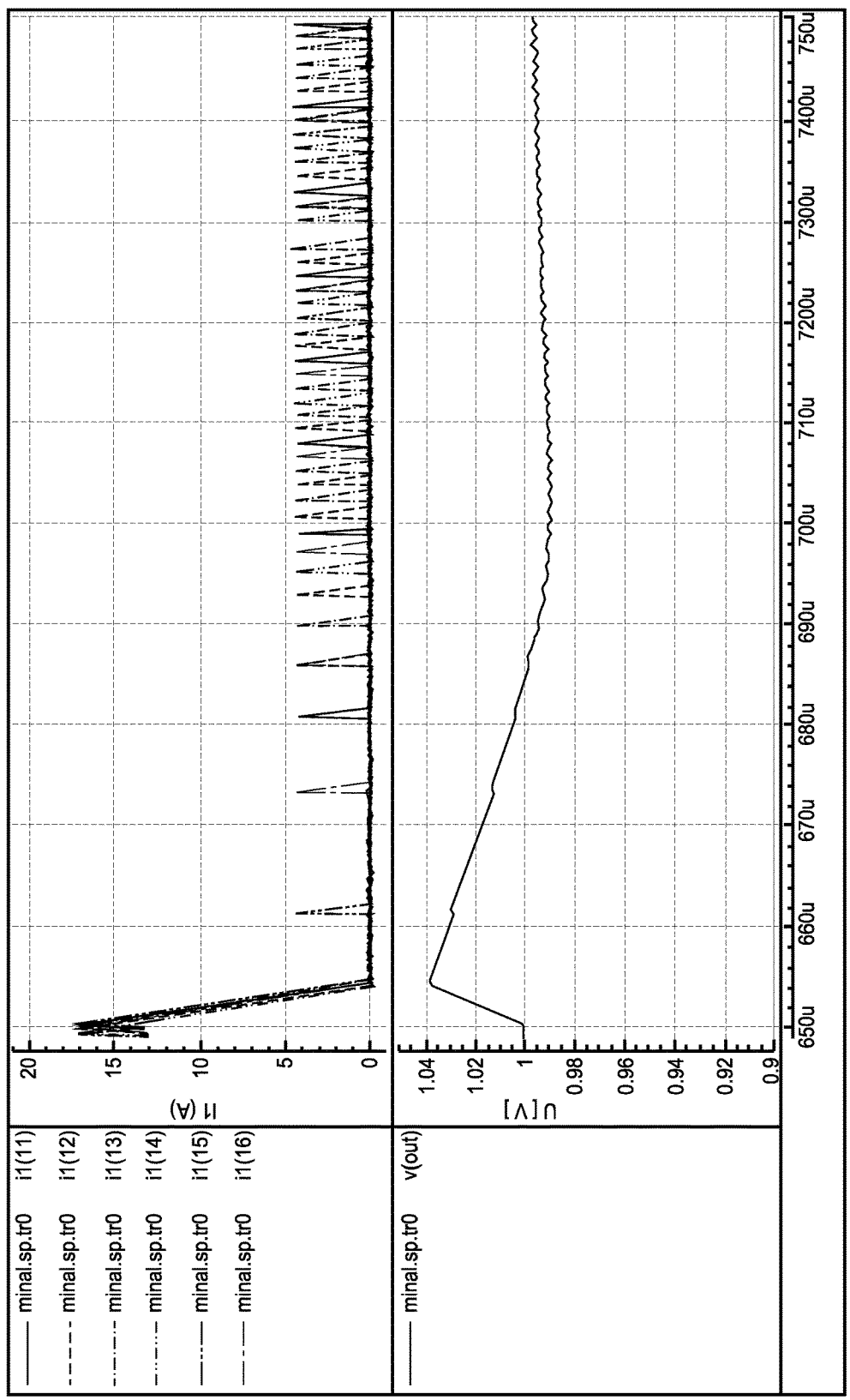

FIGS. 16-18 show waveforms of the power supply 500 in accordance with an embodiment of the present invention. FIG. 16 shows waveforms of output inductor currents (top) and output voltage VOUT (bottom) of the power supply 500 with 6 converters 101 at start-up. A 90A load was applied at 500 us and the 90A load was removed at 650 us. FIG. 17 shows the output inductor currents and output voltage VOUT when the 90A load was applied (zoom in at 500 us of FIG. 16). FIG. 18 shows the output inductor currents and output voltage VOUT when the 90A load was removed (zoom in at 650 us of FIG. 16).

Figure 19:
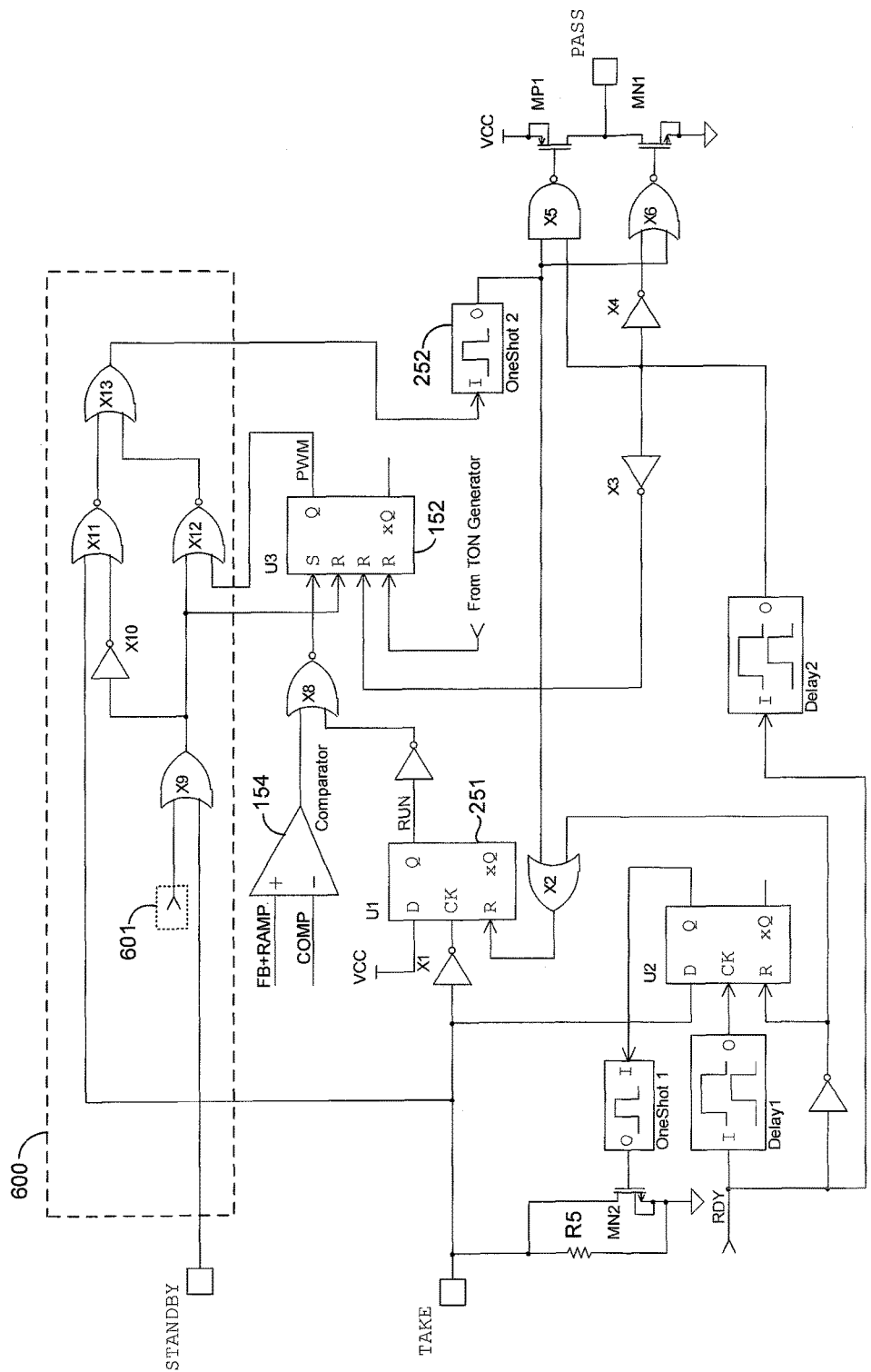
FIG. 19 shows a schematic diagram of a selection circuit that may be optionally included in the converter of FIG. 2 in accordance with an embodiment of the present invention.

FIG. 19 shows a schematic diagram of a selection circuit 600 that may be optionally included in a converter 101 to implement phase shedding, redundancy, or other modes in applications where the converter 101 may need to be selected or deselected during operation.

In the example of FIG. 19, the converter 101 further includes a STANDBY pin for receiving a STANDBY signal. The converter 101 is placed on standby when the STANDBY signal is asserted (i.e., a logic HIGH on the STANDBY pin). The STANDBY signal may be generated by an external circuit, such as a microprocessor (e.g., microprocessor 501 of FIG. 15) or a discrete circuit, when a light load condition is detected. A converter 101 that is on standby does not turn ON its output switch, and is thus bypassed.

The capability to place the converter 101 on standby allows light load efficiency to be extended using a phase shedding technique, which in the example of FIG. 19 is implemented by adding gates X9, X10, X11, X12, and X13 in the converter 101. With phase shedding, one or more converters 101 are placed on standby when the load is light, with the remaining converters 101 automatically re-interleaving evenly. In the example of FIG. 19, a logic HIGH on the STANDBY pin resets the latch 152 and makes the PWM signal to be always LOW, thereby placing the converter 101 on standby because its output switch will not turn ON. When the converter 101 is on standby, a GO indicator from the TAKE pin is propagated to the PASS pin through the circuit 600 to allow the next converter 101 in the sequence to turn ON. The other components shown in FIG. 19 operate as previously described.

The selection circuit 600 may also allow for redundancy. In applications where critical regulation is needed, multiple converters 101 can be placed in parallel so that if a converter 101 fails then another converter 101 in parallel to it can take its place. In the example of FIG. 19, redundancy may be implemented by connecting the input 601 of the gate X9 to a fault condition signal. When a converter 101 has a fault condition (FAULT=1), the fault condition signal on the input 601 resets the latch 152 so that the PWM signal is always LOW, thereby allowing a GO indicator from the TAKE pin to propagate to the PASS pin through the circuit 600 to allow the next converter 101 to continue.

Depending on the particular implementation, the interleaving accuracy of a multiphase power supply may be affected by mismatches between the COT DC-DC converter IC's. For example, in the multiphase power supply 100 of FIG. 1, the converters 101 may have different parameters, such as main comparators with different input offset voltages (Vos), amplifiers with different transconductance gains, etc. These differences may lead to interleaving errors when the mismatch between converters 101 is relatively large, thereby deteriorating the benefits of precise interleaving.

Figure 20:
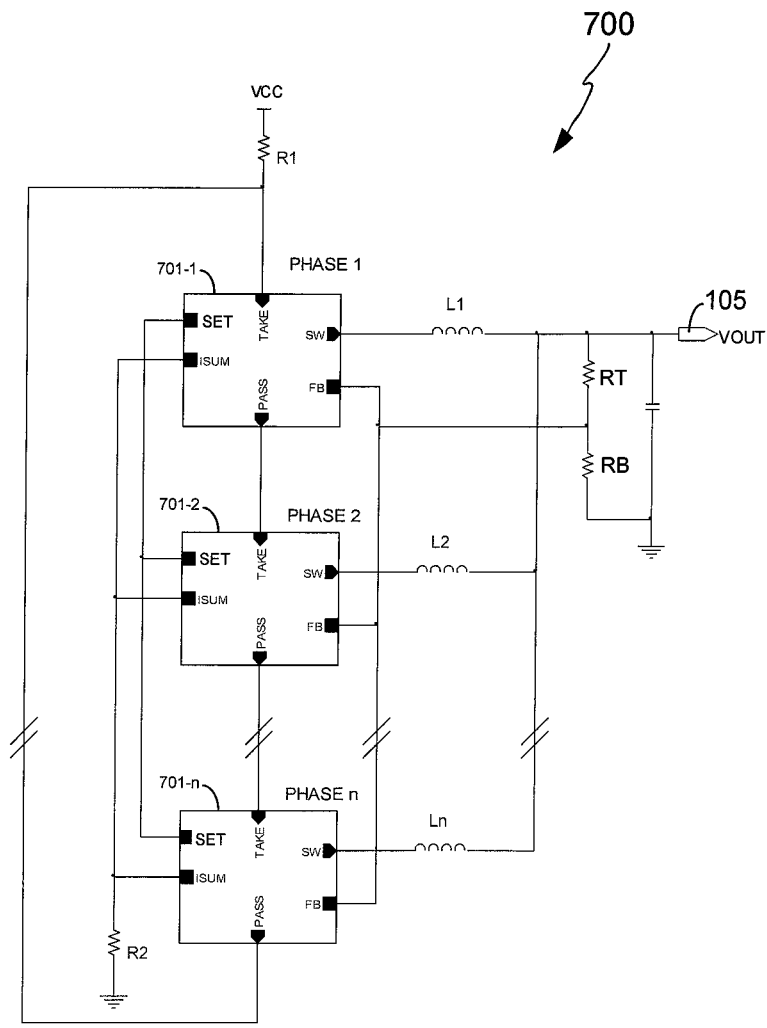
FIG. 20 shows a schematic diagram of a multiphase power supply in accordance with an embodiment of the present invention.

FIG. 20 shows a schematic diagram of a multiphase power supply 700 in accordance with an embodiment of the present invention. The multiphase power supply 700 is the same as the multiphase power supply 100 of FIG. 1 except for the use of COT DC-DC converter IC's 701 (i.e., 701-1, 701-2, . . . , 701-n) instead of converters 101.

In one embodiment, a COT DC-DC converter IC 701 ("converter 701") is the same as a converter 101 except for the addition of features that allow for improved interleaving synchronization. More particularly, a converter 701 further includes a SET pin for transmitting or receiving a SET signal that adds another layer of interleaving synchronization. In a nutshell, the Phase1 converter 701, i.e. the converter 701 that will turn ON first upon power up, continuously generates a SET signal at the SET pin. In this example, the Phase1 converter 701 serves as the master converter that continuously generates the SET signal, while the other converters 701 serve as slave converters that receive the SET signal.

Figure 21:
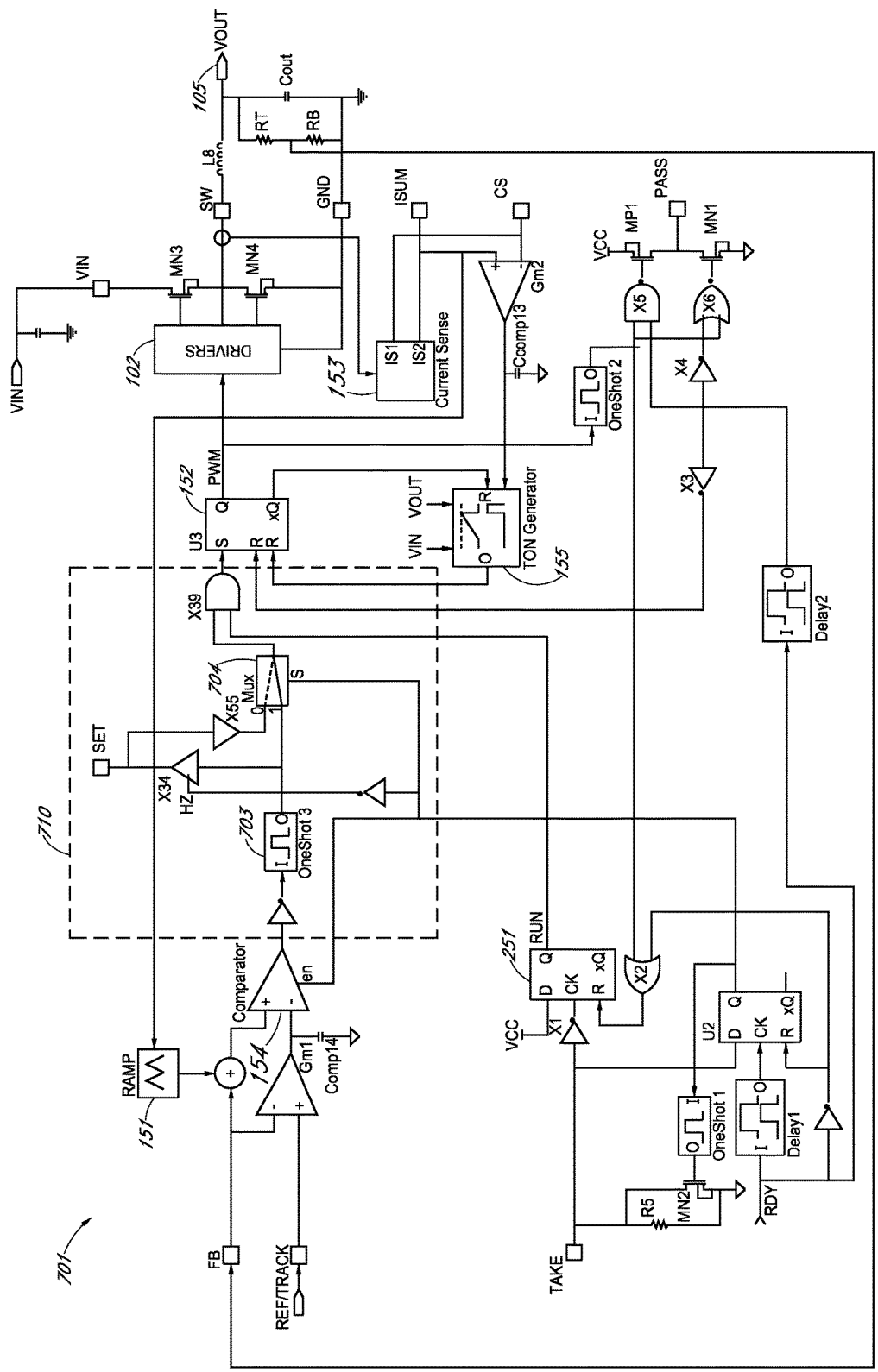
FIG. 21 shows a schematic diagram of a COT DC-DC converter IC in the multiphase power supply of FIG. 20 in accordance with an embodiment of the present invention.

In the example of FIG. 21, the SET signal generated by the master converter 701 may comprise N pulses, with N corresponding to the number of phases in the multiphase power supply. The slave converters 701 accept the SET signal at the SET pin and generate their PWM signal in synchronization with a GO indicator received at the TAKE pin. The converters 701 thus turn ON in sequence, using the SET signal and a GO indicator for interleaving synchronization. The comparator stages of the slave converters 701 are disabled during startup.

FIG. 21 shows a schematic diagram of a COT DC-DC converter IC 701 in accordance with an embodiment of the present invention. In one embodiment, the converter 701 is the same as a converter 101 except for the addition of an interleaving synchronization circuit for compensating for circuit mismatches between converters 701 in a multiphase power supply.

In the example of FIG. 21, an interleaving synchronization circuit 710 is included in the path between the comparator stage and the output stage of the converter 701. In the example of FIG. 21, for a master converter 701 (which is also the Phase1 converter in this example), the amplifier Gm1, the comparator 154, a smart one-shot circuit 703, and a buffer X34 internally generate N SET pulses (one pulse per phase) to trigger the slave converters 701 in the multiphase power supply. In the example of FIG. 21, the ramp generator 151 is configured to have a frequency of N*fs, where fs is the phase switching frequency of the multiphase power supply. In one embodiment, the smart one-shot circuit 703 works as a conventional one-shot circuit in steady state condition. During load step condition when the output of the comparator 154 is always HIGH, the output the smart one-shot circuit 703 will be set after a minimum off time Toffmin, then turns ON for a time Toneshot3, then resets for a minimum off time Toffmin, and so on. This will repeat until the HIGH condition of the comparator 154 output disappears. In this way, an SET pulse will generate a high frequency pulse during the transient, improving the transient response.

In the example of FIG. 21, internally generated SET pulses from the smart one-shot circuit 703 are presented to a first input of a multiplexer 704. A second input of the multiplexer 704 is coupled to receive SET pulses from the SET pin. The multiplexer 704 outputs either the internally generated SET pulses or the SET pulses from the SET pin. The multiplexer 704 of the master converter 701 selects the internally generated SET pulses; the multiplexer 704 of the slave converters 701 selects the SET pulses from the SET pin. The multiplexer 704 outputs the selected SET pulses to a gate X39, which allows the SET pulses to be synchronized with the RUN signal output of the D flip-flop 251 for interleaving synchronization. The output of the gate X39 is presented to the input of the D flip-flop 152, which generates the PWM signal for controlling switching of the output switch as before. The other components of the converter 701 operate as previously described in a converter 101.

Figure 22:
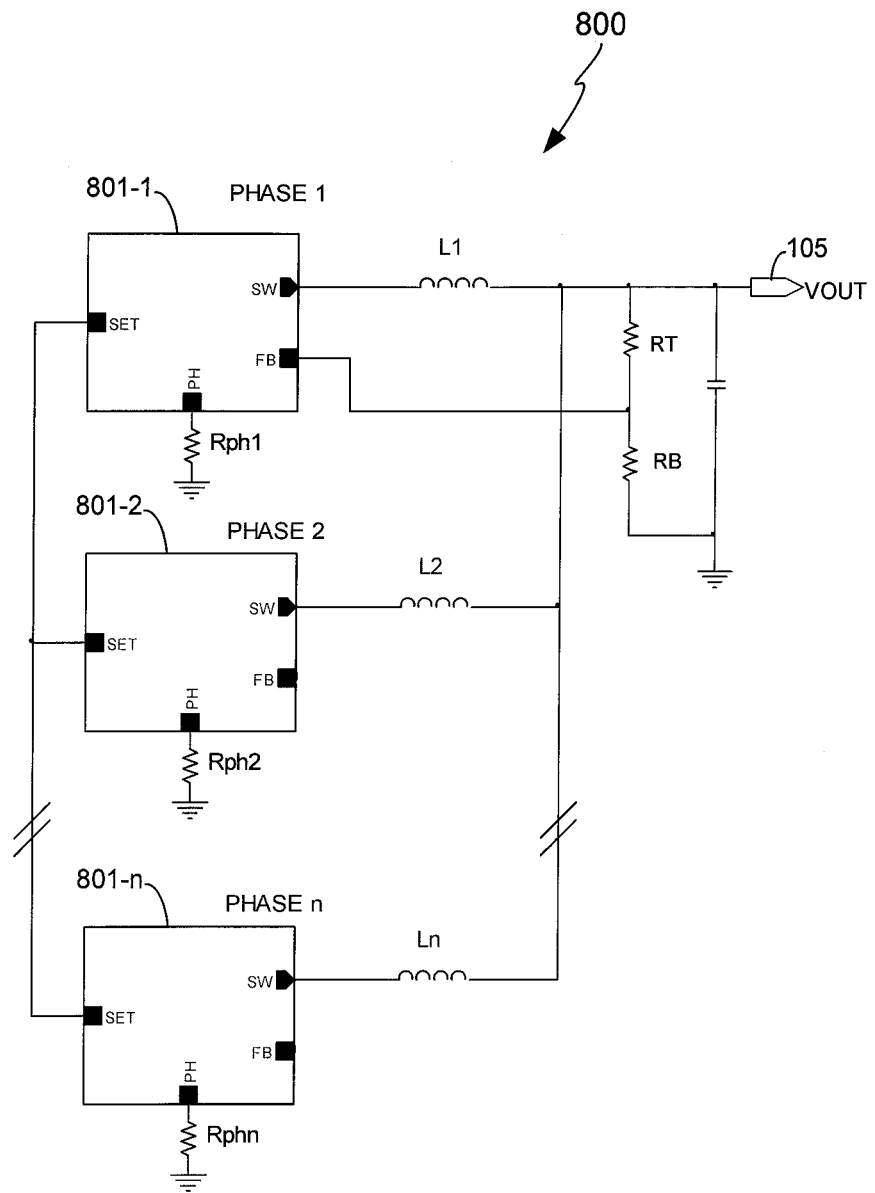
FIG. 22 shows a schematic diagram of a multiphase power supply in accordance with an embodiment of the present invention.

FIG. 22 shows a schematic diagram of a multiphase power supply 800 in accordance with an embodiment of the present invention. The multiphase power supply 800 of FIG. 22 is the same as the multiphase power supply 100 of FIG. 1 except for the use of COT DC-DC converters IC's 801 (i.e., 801-1, 801-2, . . . , 801-*n*) instead of converters 101.

In the example of FIG. 22, a COT DC-DC converter IC 801 ("converter 801") includes a PH pin that allows for designating a phase order of the converters 801 of the multiphase power supply 800. In one embodiment, the phase order of the converters 801, i.e., the sequence the converters 801 turn ON, is set by providing different value resistors Rph at the PH pins of the converters 801. In one embodiment, the converter 801 with the highest PH voltage on its PH pin, which is dictated by the value of the Rph resistor, is designated as the master converter; the remaining converters 801 are designated as slave converters. As can be appreciated, this allows the multiphase power supply 800 to be readily scalable (e.g., to provide more current output) by simply adding more converters 801, and setting the voltage on corresponding PH pins using an appropriate-sized resistor Rph to set their phase order.

In the example of FIG. 22, the converter 801-1 is designated as the master converter. In one embodiment, the master converter 801 receives the feedback voltage indicative of the output voltage VOUT at the node 105 of the multiphase power supply. The master converter 801 generates its PWM signal based on its internally generated SET signal and the feedback voltage indicative of the output voltage VOUT at the node 105. The master converter 801 continuously generates the SET signal that is provided to the slave converters 801. The slave converters 801 generate their internal PWM signal based on the SET signal received from the master converter 801. In the example of FIG. 22, the slave converters 801 do not require receiving the feedback voltage. Accordingly, in the example of FIG. 22, the FB pin of the converter 801-1 receives the feedback voltage from the feedback network comprising the resistors RT and RB. The converters 801-2, etc. do not necessarily need to receive the feedback voltage. Accordingly, the FB pins of the converters 801-2, etc. are not connected to the resistors RT/RB.

Figure 23:
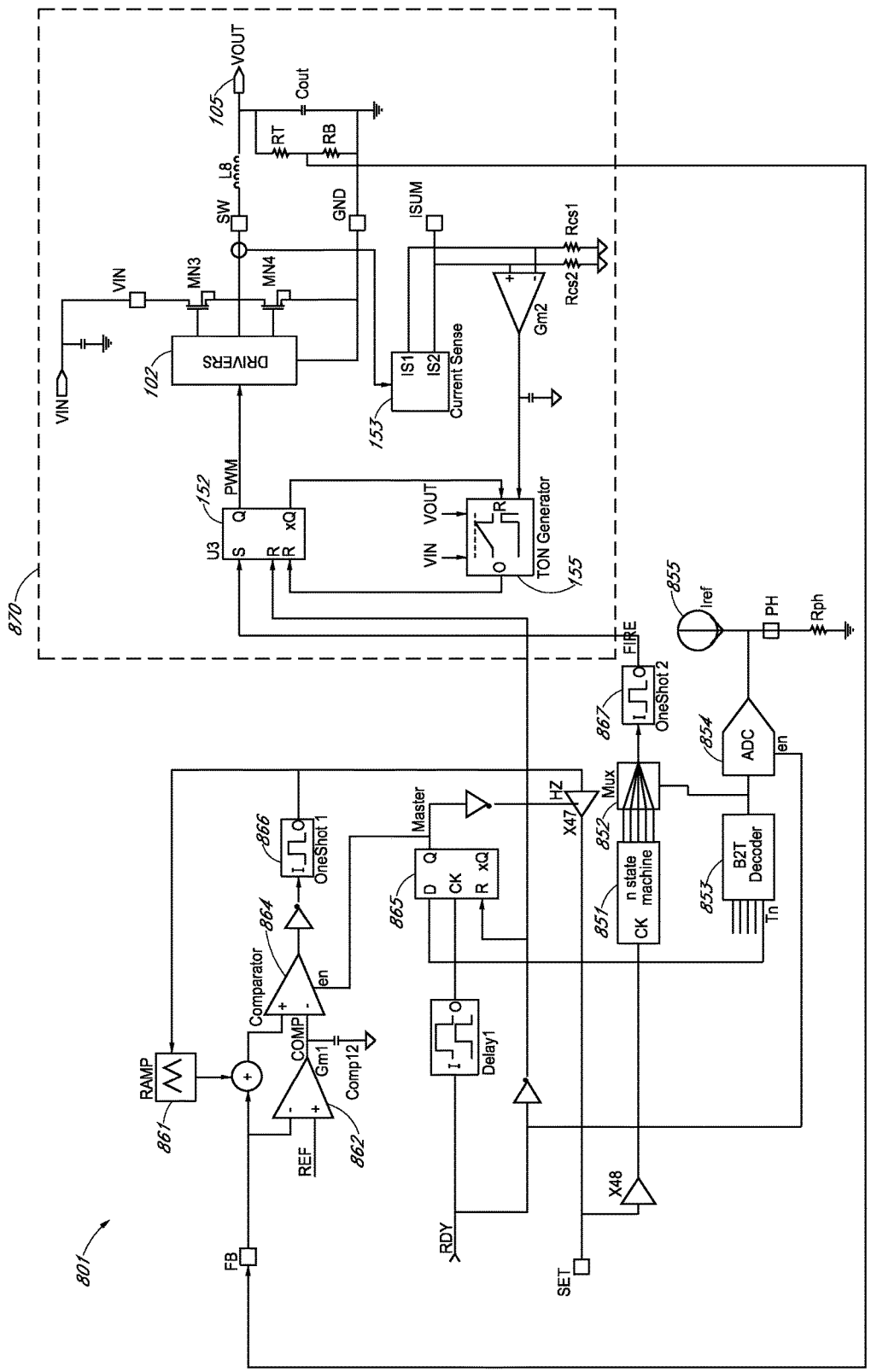
FIG. 23 shows a schematic diagram of a COT DC-DC converter IC in the multiphase power supply of FIG. 22 in accordance with an embodiment of the present invention.

FIG. 23 shows a schematic diagram of a converter 801 in accordance with an embodiment of the present invention. In the example of FIG. 23, the converter 801 includes a current reference 855 that provides current to a resistor Rph connected at the PH pin. The voltage drop on the resistor Rph is converter by an analog-to-digital converter (ADC) 854 to a digital signal, which is decoded by a binary-to-thermometer (B2T) decoder 853. The most significant bit (MSB) of the decoder 853 is coupled to the D input of the D flip-flop 865. The converter 801 that is designated as the master converter is configured with a resistor Rph that turns ON the MSB of the decoder 853. The slave converters 801 are configured with lower value resistors Rph.

In the example of FIG. 23, the output of the ADC 854 also designates the phase order of the converter 801 by selecting an input of a multiplexer 852. The inputs of the multiplexer 802 are coupled to the output of the N-state machine 851. The ramp generator 861 may be configured to have a frequency of N*fs, where fs is the phase switching frequency of the multiphase power supply. The state machine 851 may be configured to have N states, one for each phase. The output of the ADC converter 854 indicates the phase order of the converter 801, and selects the input of the multiplexer 852 for that phase order. The output of the multiplexer 852 is thus active to trigger the one-shot circuit 867 when it is the converter's 801 turn to turn ON per its phase order.

In one embodiment, the converter 801 that is designated as the master converter generates the SET signal. In the example of FIG. 23, the master converter 801 receives the feedback voltage FB at the FB pin. An amplifier 862 generates the COMP voltage based on the level of the feedback voltage FB relative to the reference voltage REF. The feedback voltage FB is summed with the ramp voltage of the ramp generator 861 to generate the FB+RAMP voltage, which is compared by the main comparator 864 to the COMP voltage to generate a pump voltage VPUMP (see FIG. 24). A smart one-shot circuit 866 generates the SET signal as triggered by the pump voltage VPUMP.

Figure 24:
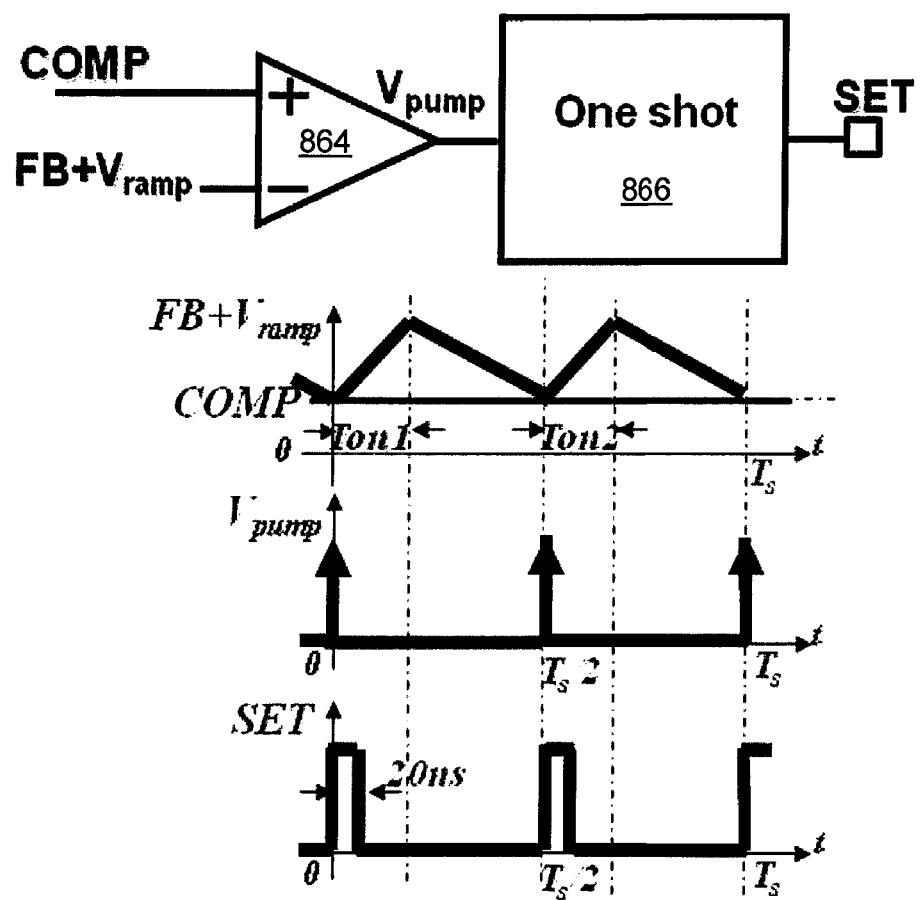
FIG. 24 illustrates how a SET signal is generated by the COT DC-DC converter IC of FIG. 23 when configured as a master converter in accordance with an embodiment of the present invention.

FIG. 24 shows how the SET signal is generated by the master converter 801 in accordance with an embodiment of the present invention. FIG. 24 is applicable only to a master converter 801. In one embodiment, the SET signal comprises a plurality of SET pulses that have constant pulse-widths (e.g., 20 ns). The slave converters 801 receive the SET signal at their SET pin. In the example of FIG. 24, the main comparator 864 of the master converter 801 generates the VPUMP voltage by comparing the COMP voltage to the FB+RAMP voltage. In the example of FIG. 24, a rising edge of the VPUMP voltage is generated by the comparator 864 whenever the FB+VRAMP voltage goes below the COMP voltage. The one-shot circuit 866 is triggered by a rising edge of the VPUMP voltage to generate a SET pulse with an ON-time set by the one-shot circuit 866.

Figure 25:
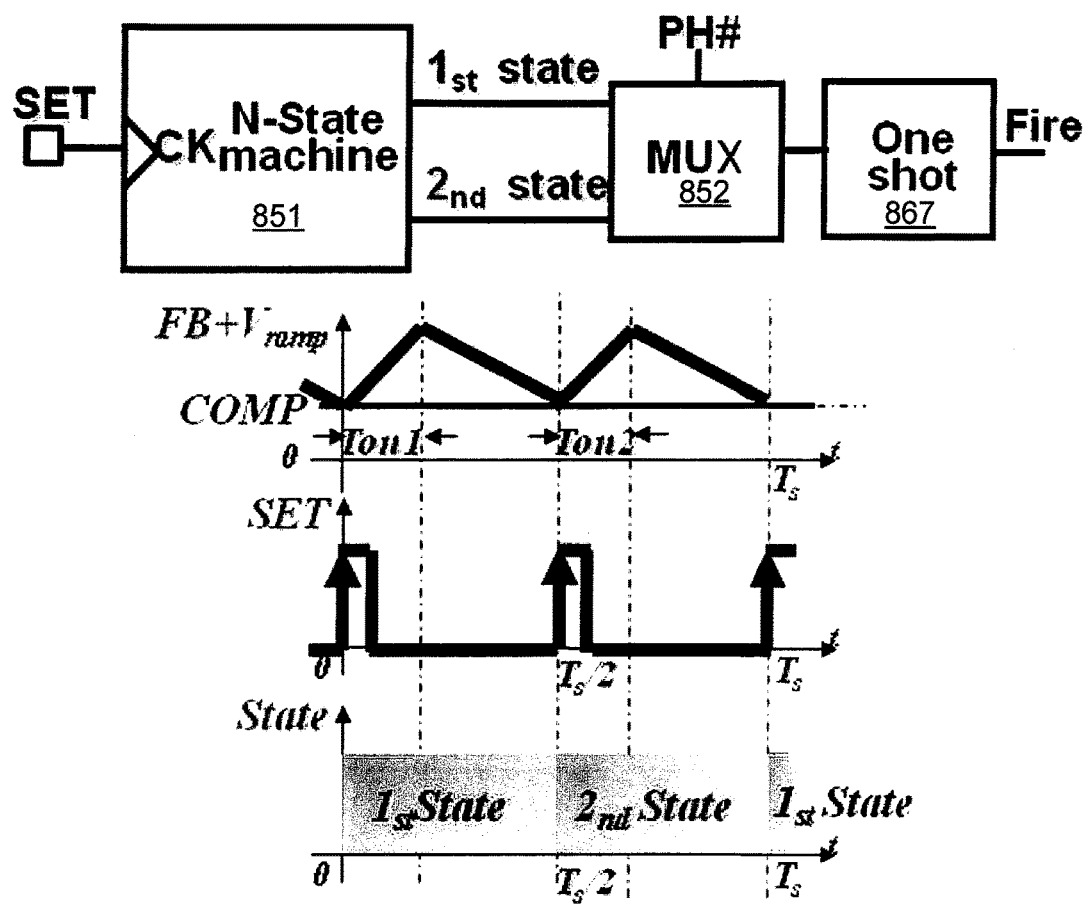
FIG. 25 illustrates synchronization of a plurality of DC-DC converter ICs of FIG. 23 in a multiphase power supply in accordance with an embodiment of the present invention.

In one embodiment, the SET signal allows for synchronization of the N phase converters 801 and sets the PWM signal of each converter 801 according to its phase order. FIG. 25 illustrates synchronization of the converters 801 in the multiphase power supply 800 of FIG. 22 in accordance with an embodiment of the present invention. FIG. 25 is applicable to both master and slave converters 801. FIG. 25 is for the case with two phases for illustration purposes only.

Figure 26:
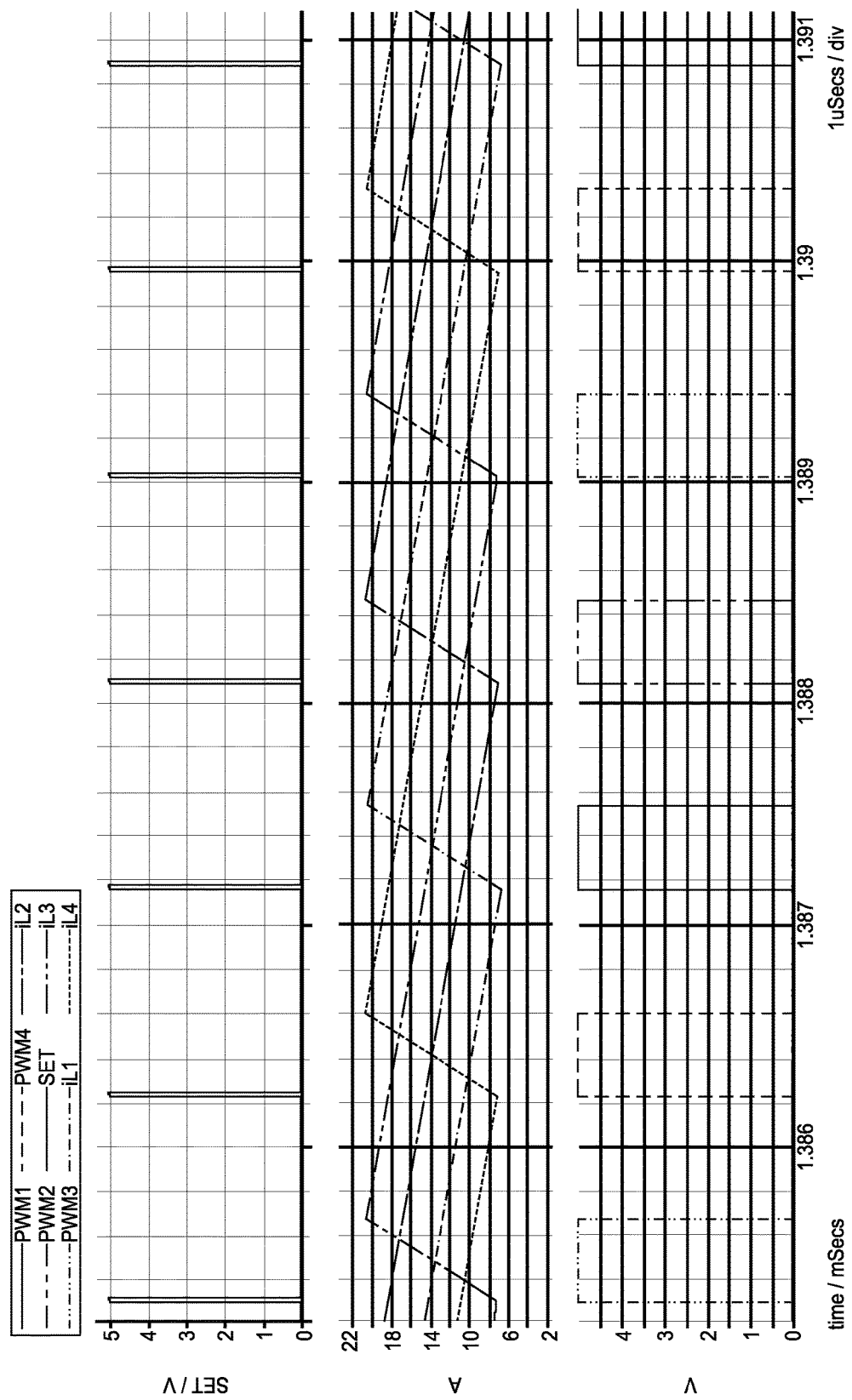
FIG. 26 shows simulation waveforms of a plurality of DC-DC converter ICs of FIG. 23 in a multiphase power supply with four phases in accordance with an embodiment of the present invention.

As shown in FIG. 25, at the rising edge of a SET pulse, the N-state machines 851 in the converters 801 change their states together. Based on the phase order of the converters 801, only one converter 801 at a time will pass a SET signal through its multiplexer 852 to fire the one-shot circuit 867 and set the PWM signal generated by its D flip-flop 152. Setting the PWM signal turns ON the output switch. Referring back to FIG. 23, the PWM signal is received in an output stage 870 to control switching of the output switch MN3 as previously explained in earlier figures (e.g., see FIG. 2). As shown in FIG. 25, at the rising edge of the next SET pulse, the next converter 801 in the sequence will set its PWM signal, and so on. FIG. 26, shows simulation waveforms of an example multiphase power supply 800 (see FIG. 22) with four phases.

Multiphase power supplies with constant ON-time DC-DC converter ICs have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A multiphase power supply comprising:
    a first constant ON-time (COT) DC-DC converter integrated circuit (IC) that is configured to provide an output voltage at a first phase of a multiphase power supply, the first COT DC-DC converter IC having a first pin and a second pin, the first COT DC-DC converter IC being configured to turn ON an output switch of the first COT DC-DC converter IC to connect an input voltage received in the first COT DC-DC converter IC to an output node of the multiphase power supply, the first COT DC-DC converter IC being configured to generate a first indicator signal at the second pin of the first COT DC-DC converter IC; and
    a second COT DC-DC converter IC that is configured to provide the output voltage at a second phase of the multiphase power supply, the second COT DC-DC converter IC having a first pin that is coupled to the second pin of the first COT DC-DC converter IC, the second COT DC-DC converter IC being configured to turn ON an output switch of the second COT DC-DC converter IC to connect an input voltage received in the second COT DC-DC converter IC to the output node of the multiphase power supply in response to receiving the first indicator signal on the first pin of the second COT DC-DC converter IC,
    wherein the first and second COT DC-DC converter ICs have a same constant on-time, and
    wherein the second COT DC-DC converter IC comprises a compensation circuit that is configured to generate a compensated signal by comparing a reference signal to a feedback signal indicative of the output voltage, and an interleaving circuit that is configured to control the compensated signal with the first indicator signal to turn ON the second COT DC-DC converter IC for the constant on-time.

2. The multiphase power supply of claim 1, wherein the first indicator signal comprises a pulse and the second COT DC-DC converter IC turns ON the output switch of the second COT DC-DC converter IC in response to detecting a rising edge of the pulse.

3. The multiphase power supply of claim 1, wherein the first COT DC-DC converter IC turns ON the output switch of the first COT DC-DC converter IC in response to receiving a second indicator signal on the first pin of the first COT DC-DC converter IC.

4. The multiphase power supply of claim 1, further comprising a resistor that is external to the first COT DC-DC converter IC and is coupled to the first pin of the first COT DC-DC converter IC, and wherein the first COT DC-DC converter IC turns ON the output switch of the first COT DC-DC converter IC during startup in response to detecting a voltage on a node of the resistor.

5. The multiphase power supply of claim 1, wherein the second COT DC-DC converter IC turns ON the output switch of the second COT DC-DC converter IC in synchronization with a synchronization signal received on a third pin of the second COT DC-DC converter IC.

6. The multiphase power supply of claim 5, wherein the synchronization signal consists of a number of pulses that is equal to a number of COT DC-DC converter ICs in the multiphase power supply.

7. The multiphase power supply of claim 5, wherein a third pin of the first COT DC-DC converter IC is coupled to the third pin of the second COT DC-DC converter IC, and the first COT DC-DC converter IC outputs the synchronization signal at the third pin of the first COT DC-DC converter IC.

8. The multiphase power supply of claim 7, further comprising:
    a third COT DC-DC converter IC that is configured to turn ON an output switch of the third COT DC-DC converter IC in synchronization with receiving a third indicator signal at a first pin of the third COT DC-DC converter IC and with receiving the synchronization signal that is output from the third pin of the first COT DC-DC converter IC.

9. The multiphase power supply of claim 1, further comprising:
    a microcontroller that is configured to enable or disable COT DC-DC converter ICs in the multiphase power supply.

10. The multiphase power supply of claim 9, wherein the microcontroller is configured to receive fault condition signals from the COT DC-DC converter ICs of the multiphase power supply.

11. A constant ON-time (COT) DC-DC converter integrated circuit (IC) comprising:

an output switch;

a first pin configured to receive a first control signal;

a pulse width modulation (PWM) circuit that generates a PWM signal that controls switching of the output switch in synchronization with the first control signal, wherein the PWM signal turns ON the output switch for a constant ON-time;

a second pin;

a compensation circuit that is configured to generate a compensation signal by comparing a reference signal to a feedback signal indicative of an output voltage of a power supply that incorporates the COT DC-DC converter IC, and an interleaving circuit that is configured to receive the first control signal and to use the first control signal to control coupling of the compensated signal to the PWM circuit, the interleaving circuit comprising a pulse generator that is coupled to an output of the PWM circuit, the pulse generator being configured to generate a second control signal that is output to the second pin in response to the PWM signal being asserted by the PWM circuit to turn ON the output switch.

12. The COT DC-DC converter IC of claim 11, further comprising:

a startup circuit that detects for presence of an external resistor on the first pin to determine whether or not to turn ON the COT DC-DC converter IC first among a plurality of COT DC-DC converter ICs in a multiphase power supply during startup.

13. The COT DC-DC converter IC of claim 11, further comprising:

a third pin configured to receive a third control signal, wherein the PWM circuit generates the PWM signal that controls the switching of the output switch in synchronization with the first control signal and the third control signal.

14. The COT DC-DC converter IC of claim 11, wherein the second pin is configured to be coupled to a pin of another COT DC-DC converter IC that turns ON its output switch in response to receiving the second control signal.

15. A multiphase power supply comprising:

a first constant ON-time (COT) DC-DC converter integrated circuit (IC) that generates an output voltage of a multiphase power supply at a first phase, the first COT DC-DC converter IC being configured to generate a first control signal at a first pin;

a second COT DC-DC converter IC that generates the output voltage of the multiphase power supply at a second phase, the second COT DC-DC converter IC being configured to receive the first control signal at a first pin of the second COT DC-DC converter IC, and to turn ON an output switch of the second COT DC-DC converter IC for a constant ON-time in synchronization with the first control signal; and a third COT DC-DC converter IC that is configured to receive a second control signal from a second pin of the second COT DC-DC converter IC, and to turn ON an output switch of the third COT DC-DC converter IC for a constant ON-time in synchronization with the second control signal, wherein the second COT DC-DC converter IC comprises a compensation circuit that is configured to generate a compensated signal by comparing a reference signal to a feedback signal indicative of the output voltage of the multiphase power supply, and an interleaving circuit that is configured to control the compensated signal with the first indicator signal to turn ON the second COT DC-DC converter IC for a duration of the constant on-time of the second COT DC-DC converter IC.

16. The multiphase power supply of claim 15, wherein a phase order of turning ON an output switch of the first COT DC-DC converter IC, the output switch of the second COT DC-DC converter IC, and the output switch of the third COT DC-DC converter is dictated by a value of a resistor that is external to the first COT DC-DC converter IC and is coupled to a second pin of the first COT DC-DC converter IC.

17. The multiphase power supply of claim 15, wherein the second COT DC-DC converter IC is configured to turn ON the output switch of the second COT DC-DC converter IC in synchronization with the first control signal and a third control signal that is continuously generated by the first COT DC-DC converter IC.

* * * * *